(12) United States Patent
Ebrahimi

(10) Patent No.: US 11,722,301 B2
(45) Date of Patent: Aug. 8, 2023

(54) BLOCKCHAIN ID CONNECT

(71) Applicant: Ping Identity Corporation, Denver, CO (US)

(72) Inventor: Armin Ebrahimi, Palo Alto, CA (US)

(73) Assignee: Ping Identity Corporation, Denver, CO (US)

( * ) Notice: Subject to any disclaimer, the term of this patent is extended or adjusted under 35 U.S.C. 154(b) by 25 days.

(21) Appl. No.: 17/226,386

(22) Filed: Apr. 9, 2021

(65) Prior Publication Data

US 2022/0029807 A1    Jan. 27, 2022

Related U.S. Application Data

(63) Continuation of application No. 16/656,477, filed on Oct. 17, 2019, now Pat. No. 10,979,227.
(Continued)

(51) Int. Cl.
*H04L 9/40* (2022.01)
*H04L 9/32* (2006.01)
(Continued)

(52) U.S. Cl.
CPC .......... *H04L 9/3213* (2013.01); *H04L 9/0637* (2013.01); *H04L 9/0866* (2013.01); *H04L 9/3228* (2013.01)

(58) Field of Classification Search
CPC ... H04L 9/3213; H04L 9/0637; H04L 9/0866; H04L 9/3228
See application file for complete search history.

(56) References Cited

U.S. PATENT DOCUMENTS 5,005,200 A    4/1991  Fischer
5,901,229 A    5/1999  Fujisaki et al.
(Continued)

FOREIGN PATENT DOCUMENTS

JP    2005260490 A    9/2005
JP    2006179016 A    7/2006
(Continued)

OTHER PUBLICATIONS

Barreto, P. S. L. M. et al., (2001) "Fast hashing onto elliptic curves over fields of characteristic 3," [Online], Cryptology ePrint Archive: Report 2001/098, Received Nov. 15, 2001, Retrieved from the Internet: URL: https://eprint.iacr.org/2001/098/, 12 pages.
(Continued)

*Primary Examiner* — Ghodrat Jamshidi

(57) ABSTRACT

A method for login, including making a login request to an entity through a federation server that generates a session identifier. A QR code is sent to the federation server to receive the session identifier. A secure envelope including user personal information is sent to the federation server to verify user registration with the federation server. A login token generated by the federation server is received and is associated with a smart contract generated by the federation server and stored on a blockchain. The login token is signed using user private key and sent to the blockchain for inclusion in the smart contract. A transaction identifier is received from the blockchain, and is sent to the federation server that generates a session record based on the login token. The federation server sends user verification to the entity to authorize a communication session between the user device and the entity.

17 Claims, 21 Drawing Sheets

Related U.S. Application Data

(60) Provisional application No. 62/747,044, filed on Oct. 17, 2018.

(51) Int. Cl.
*H04L 9/08* (2006.01)
*H04L 9/06* (2006.01)

(56) References Cited

U.S. PATENT DOCUMENTS

| | | |
|---|---|---|
| 5,923,763 A | 7/1999 | Walker et al. |
| 5,996,076 A | 11/1999 | Rowney et al. |
| 6,088,717 A | 7/2000 | Reed et al. |
| 6,310,966 B1 | 10/2001 | Dulude et al. |
| 6,785,815 B1 | 8/2004 | Serret-Avila et al. |
| 6,792,536 B1 | 9/2004 | Teppler |
| 7,043,635 B1 | 5/2006 | Keech |
| 7,225,161 B2 | 5/2007 | Lam et al. |
| 7,406,596 B2 | 7/2008 | Tararoukhine et al. |
| 7,451,116 B2 | 11/2008 | Parmelee et al. |
| 7,502,467 B2 | 3/2009 | Brainard et al. |
| 7,873,573 B2 | 1/2011 | Realini |
| 7,949,606 B1 | 5/2011 | Sweet |
| 8,056,822 B2 | 11/2011 | Bourrieres et al. |
| 8,078,880 B2 | 12/2011 | Nanda et al. |
| 8,249,965 B2 | 8/2012 | Tumminaro |
| 8,447,967 B1 | 5/2013 | Janacek et al. |
| 8,502,060 B2 | 8/2013 | Ribner |
| 8,607,358 B1 | 12/2013 | Shankar et al. |
| 8,744,076 B2 | 6/2014 | Youn |
| 8,762,712 B1 | 6/2014 | Kwan et al. |
| 8,832,807 B1 | 9/2014 | Kuo et al. |
| 8,874,915 B1 | 10/2014 | Rodoper et al. |
| 8,966,276 B2 | 2/2015 | Nanopoulos et al. |
| 9,059,858 B1 | 6/2015 | Giardina et al. |
| 9,135,787 B1 | 9/2015 | Russell et al. |
| 9,172,699 B1 | 10/2015 | Vazquez et al. |
| 9,189,788 B1 | 11/2015 | Robinson et al. |
| 9,240,058 B1 | 1/2016 | Amacker et al. |
| 9,288,047 B2 | 3/2016 | Brouwer et al. |
| 9,331,856 B1 | 5/2016 | Song |
| 9,397,985 B1 | 7/2016 | Seger, II et al. |
| 9,608,822 B2 | 3/2017 | Lochmatter et al. |
| 9,646,150 B2 | 5/2017 | Toth |
| 9,679,276 B1 | 6/2017 | Cuende |
| 9,722,790 B2 | 8/2017 | Ebrahimi |
| 9,876,646 B2 | 1/2018 | Ebrahimi et al. |
| 9,887,975 B1 | 2/2018 | Gifford et al. |
| 9,917,828 B2 * | 3/2018 | Byrum ............... H04L 63/0435 |
| 9,948,467 B2 | 4/2018 | King |
| 10,007,826 B2 | 6/2018 | Ebrahimi et al. |
| 10,007,913 B2 | 6/2018 | Ebrahimi |
| 10,108,954 B2 * | 10/2018 | Dunlevy ............... G16Z 99/00 |
| 10,110,385 B1 | 10/2018 | Rush et al. |
| 10,163,105 B1 | 12/2018 | Ziraknejad et al. |
| 10,255,419 B1 | 4/2019 | Kragh |
| 10,257,179 B1 | 4/2019 | Saylor et al. |
| 10,341,091 B2 | 7/2019 | Keranen et al. |
| 10,341,123 B2 | 7/2019 | Ebrahimi et al. |
| 10,417,219 B1 | 9/2019 | Yang et al. |
| 10,498,541 B2 | 12/2019 | Ebrahimi et al. |
| 10,498,542 B2 | 12/2019 | Ebrahimi et al. |
| 10,509,932 B2 | 12/2019 | Ebrahimi et al. |
| 10,554,654 B1 * | 2/2020 | Ramanathan ......... H04L 63/104 |
| 10,587,609 B2 | 3/2020 | Ebrahimi et al. |
| 10,657,532 B2 | 5/2020 | Ebrahimi |
| 10,740,584 B2 | 8/2020 | Ebrahimi et al. |
| 10,805,085 B1 * | 10/2020 | Liang .................. H04L 9/3247 |
| 10,979,227 B2 | 4/2021 | Ebrahimi |
| 11,025,626 B1 * | 6/2021 | Todd ................... H04L 9/3297 |
| 11,030,187 B1 * | 6/2021 | Boodman ............. G06F 16/235 |
| 11,062,106 B2 | 7/2021 | Ebrahimi et al. |
| 11,082,221 B2 | 8/2021 | Ebrahimi et al. |
| 11,134,075 B2 | 9/2021 | Ebrahimi et al. |
| 11,206,133 B2 | 12/2021 | Ebrahimi et al. |
| 11,263,415 B2 | 3/2022 | Ebrahimi et al. |
| 11,323,272 B2 | 5/2022 | Ebrahimi et al. |
| 11,544,367 B2 | 1/2023 | Ebrahimi |
| 11,544,487 B2 | 1/2023 | Ebrahimi et al. |
| 2001/0011350 A1 | 8/2001 | Zabetian |
| 2002/0016913 A1 | 2/2002 | Wheeler et al. |
| 2002/0071565 A1 | 6/2002 | Kurn et al. |
| 2002/0138735 A1 | 9/2002 | Felt et al. |
| 2002/0141593 A1 | 10/2002 | Kurn et al. |
| 2002/0170966 A1 | 11/2002 | Hannigan et al. |
| 2003/0014372 A1 | 1/2003 | Wheeler et al. |
| 2003/0037261 A1 | 2/2003 | Meffert et al. |
| 2003/0046159 A1 | 3/2003 | Ebrahimi et al. |
| 2003/0070075 A1 | 4/2003 | Deguillaume et al. |
| 2003/0172273 A1 | 9/2003 | Hans |
| 2004/0064693 A1 | 4/2004 | Pabla et al. |
| 2005/0039040 A1 | 2/2005 | Ransom et al. |
| 2005/0091495 A1 | 4/2005 | Cameron et al. |
| 2005/0114447 A1 | 5/2005 | Cameron et al. |
| 2006/0041756 A1 | 2/2006 | Ashok et al. |
| 2006/0071077 A1 | 4/2006 | Suomela et al. |
| 2006/0075255 A1 | 4/2006 | Duffy et al. |
| 2006/0256961 A1 | 11/2006 | Brainard et al. |
| 2007/0016785 A1 | 1/2007 | Guay et al. |
| 2007/0017996 A1 | 1/2007 | Xia et al. |
| 2007/0033150 A1 | 2/2007 | Nwosu |
| 2007/0118479 A1 | 5/2007 | Halsema et al. |
| 2007/0277013 A1 | 11/2007 | Rexha et al. |
| 2007/0294538 A1 | 12/2007 | Lim et al. |
| 2008/0078836 A1 | 4/2008 | Tomita |
| 2008/0116277 A1 | 5/2008 | Tomita |
| 2008/0155253 A1 | 6/2008 | Liu |
| 2008/0178008 A1 | 7/2008 | Takahashi et al. |
| 2008/0235772 A1 | 9/2008 | Janzen |
| 2008/0267511 A1 | 10/2008 | Bourrieres et al. |
| 2009/0066478 A1 | 3/2009 | Colella |
| 2009/0132813 A1 | 5/2009 | Schibuk |
| 2009/0232346 A1 | 9/2009 | Zilch |
| 2009/0235332 A1 | 9/2009 | Nuzzi et al. |
| 2009/0266882 A1 | 10/2009 | Sajkowsky |
| 2010/0020970 A1 | 1/2010 | Liu et al. |
| 2010/0023758 A1 | 1/2010 | Han et al. |
| 2010/0052852 A1 | 3/2010 | Mohanty |
| 2010/0070759 A1 | 3/2010 | Leon Cobos et al. |
| 2010/0088517 A1 | 4/2010 | Piersol |
| 2010/0100724 A1 | 4/2010 | Kaliski, Jr. |
| 2010/0191972 A1 | 7/2010 | Kiliccote |
| 2010/0228674 A1 | 9/2010 | Ogg et al. |
| 2010/0250939 A1 | 9/2010 | Adams et al. |
| 2010/0272193 A1 | 10/2010 | Khan et al. |
| 2011/0093249 A1 | 4/2011 | Holmes et al. |
| 2011/0121066 A1 | 5/2011 | Tian et al. |
| 2011/0231913 A1 | 9/2011 | Feng et al. |
| 2011/0286595 A1 | 11/2011 | Resch et al. |
| 2011/0302412 A1 | 12/2011 | Deng et al. |
| 2011/0307703 A1 | 12/2011 | Ogg et al. |
| 2012/0061461 A1 | 3/2012 | Bourrieres et al. |
| 2012/0067943 A1 | 3/2012 | Saunders et al. |
| 2012/0086971 A1 | 4/2012 | Bisbee et al. |
| 2012/0125997 A1 | 5/2012 | Burra et al. |
| 2012/0137131 A1 | 5/2012 | Lu et al. |
| 2012/0185398 A1 | 7/2012 | Weis et al. |
| 2012/0211567 A1 | 8/2012 | Herzig |
| 2012/0297190 A1 | 11/2012 | Shen et al. |
| 2012/0297464 A1 | 11/2012 | Busch et al. |
| 2012/0308003 A1 | 12/2012 | Mukherjee |
| 2013/0010958 A1 | 1/2013 | Yao |
| 2013/0014152 A1 | 1/2013 | Johnson et al. |
| 2013/0037607 A1 | 2/2013 | Bullwinkel |
| 2013/0065564 A1 | 3/2013 | Conner et al. |
| 2013/0111208 A1 | 5/2013 | Sabin et al. |
| 2013/0145152 A1 | 6/2013 | Maino et al. |
| 2013/0153666 A1 | 6/2013 | Edwards |
| 2013/0159021 A1 | 6/2013 | Felsher |
| 2013/0173915 A1 | 7/2013 | Haulund |
| 2013/0198822 A1 | 8/2013 | Hitchcock et al. |
| 2013/0228624 A1 | 9/2013 | Byrd et al. |
| 2013/0246261 A1 | 9/2013 | Purves et al. |
| 2013/0262309 A1 | 10/2013 | Gadotti |

(56) References Cited

U.S. PATENT DOCUMENTS

| | | |
|---|---|---|
| 2013/0262857 A1 | 10/2013 | Neuman et al. |
| 2013/0290733 A1 | 10/2013 | Branton et al. |
| 2013/0305059 A1 | 11/2013 | Gormley et al. |
| 2013/0311768 A1 | 11/2013 | Fosmark et al. |
| 2013/0318354 A1 | 11/2013 | Entschew et al. |
| 2013/0333009 A1 | 12/2013 | Mackler |
| 2014/0001253 A1 | 1/2014 | Smith |
| 2014/0006247 A1 | 1/2014 | Chai et al. |
| 2014/0006806 A1 | 1/2014 | Corella et al. |
| 2014/0032913 A1 | 1/2014 | Tenenboym et al. |
| 2014/0084067 A1 | 3/2014 | Vanderhulst |
| 2014/0093144 A1 | 4/2014 | Feekes |
| 2014/0188790 A1 | 7/2014 | Hunter |
| 2014/0208403 A1 | 7/2014 | Lu et al. |
| 2014/0223175 A1 | 8/2014 | Bhatnagar |
| 2014/0237565 A1 | 8/2014 | Fleysher |
| 2014/0254796 A1 | 9/2014 | Li et al. |
| 2014/0256423 A1 | 9/2014 | Williams et al. |
| 2014/0282961 A1 | 9/2014 | Dorfman et al. |
| 2014/0289842 A1 | 9/2014 | Cornick et al. |
| 2014/0304517 A1 | 10/2014 | Chidambaram et al. |
| 2014/0344015 A1 | 11/2014 | Puertolas-Montanes et al. |
| 2015/0019456 A1 | 1/2015 | Smith |
| 2015/0047000 A1 | 2/2015 | Spencer, III et al. |
| 2015/0081567 A1 | 3/2015 | Boyle et al. |
| 2015/0095352 A1 | 4/2015 | Lacey |
| 2015/0095999 A1 | 4/2015 | Toth |
| 2015/0104013 A1 | 4/2015 | Holman et al. |
| 2015/0106626 A1 | 4/2015 | Kremp et al. |
| 2015/0178515 A1 | 6/2015 | Cooley et al. |
| 2015/0220917 A1 | 8/2015 | Aabye et al. |
| 2015/0244690 A1 | 8/2015 | Mossbarger |
| 2015/0262138 A1 | 9/2015 | Hudon |
| 2015/0269389 A1 | 9/2015 | Lee |
| 2015/0269614 A1 | 9/2015 | Kramer |
| 2015/0278805 A1 | 10/2015 | Spencer, III et al. |
| 2015/0278820 A1 | 10/2015 | Meadows |
| 2015/0302401 A1 | 10/2015 | Metral |
| 2015/0332283 A1 | 11/2015 | Witchey |
| 2015/0356523 A1 | 12/2015 | Madden |
| 2015/0356555 A1 | 12/2015 | Pennanen |
| 2015/0365436 A1 | 12/2015 | Shenefiel et al. |
| 2015/0372811 A1 | 12/2015 | Le Saint et al. |
| 2016/0005032 A1 | 1/2016 | Yau et al. |
| 2016/0012465 A1 | 1/2016 | Sharp |
| 2016/0028452 A1 | 1/2016 | Chu et al. |
| 2016/0028552 A1 | 1/2016 | Spanos et al. |
| 2016/0072800 A1 | 3/2016 | Soon-Shiong et al. |
| 2016/0094348 A1 | 3/2016 | Takahashi |
| 2016/0098723 A1 | 4/2016 | Feeney |
| 2016/0098730 A1 | 4/2016 | Feeney |
| 2016/0125416 A1 | 5/2016 | Spencer et al. |
| 2016/0134593 A1 | 5/2016 | Gvili |
| 2016/0162897 A1 | 6/2016 | Feeney |
| 2016/0180338 A1 | 6/2016 | Androulaki et al. |
| 2016/0203572 A1 | 7/2016 | McConaghy et al. |
| 2016/0212146 A1 | 7/2016 | Wilson |
| 2016/0217356 A1 | 7/2016 | Wesby |
| 2016/0217436 A1 | 7/2016 | Brama |
| 2016/0241389 A1 | 8/2016 | Le Saint et al. |
| 2016/0261411 A1 | 9/2016 | Yau et al. |
| 2016/0269403 A1 | 9/2016 | Koutenaei et al. |
| 2016/0283920 A1 | 9/2016 | Fisher et al. |
| 2016/0283939 A1 | 9/2016 | Finlow-Bates |
| 2016/0283941 A1 | 9/2016 | Andrade |
| 2016/0300234 A1 | 10/2016 | Moss-Pultz et al. |
| 2016/0314462 A1* | 10/2016 | Hong ............... H04L 63/083 |
| 2016/0328713 A1 | 11/2016 | Ebrahimi |
| 2016/0330027 A1 | 11/2016 | Ebrahimi |
| 2016/0330035 A1 | 11/2016 | Ebrahimi et al. |
| 2016/0337351 A1 | 11/2016 | Spencer et al. |
| 2016/0351080 A1* | 12/2016 | Bhatnagar ............... G09C 5/00 |
| 2016/0373440 A1 | 12/2016 | Mather et al. |
| 2017/0041296 A1 | 2/2017 | Ford et al. |
| 2017/0048252 A1 | 2/2017 | Straub et al. |
| 2017/0063553 A1 | 3/2017 | Saxena et al. |
| 2017/0085377 A1 | 3/2017 | Pogmore et al. |
| 2017/0103389 A1 | 4/2017 | Sorensen et al. |
| 2017/0109735 A1 | 4/2017 | Sheng et al. |
| 2017/0141926 A1 | 5/2017 | Xu et al. |
| 2017/0180128 A1 | 6/2017 | Lu |
| 2017/0200160 A1 | 7/2017 | Kumar et al. |
| 2017/0228731 A1 | 8/2017 | Sheng et al. |
| 2017/0236121 A1 | 8/2017 | Lyons et al. |
| 2017/0255805 A1 | 9/2017 | Ebrahimi et al. |
| 2017/0257358 A1 | 9/2017 | Ebrahimi et al. |
| 2017/0279788 A1 | 9/2017 | Rosenblum et al. |
| 2017/0324711 A1 | 11/2017 | Feeney et al. |
| 2017/0344987 A1 | 11/2017 | Davis |
| 2017/0344988 A1 | 11/2017 | Cusden et al. |
| 2017/0346851 A1 | 11/2017 | Drake |
| 2017/0357826 A1 | 12/2017 | Gouget et al. |
| 2017/0359723 A1 | 12/2017 | Pal et al. |
| 2017/0372300 A1 | 12/2017 | Dunlevy et al. |
| 2018/0019879 A1* | 1/2018 | Kravitz ............... H04L 9/3236 |
| 2018/0068103 A1 | 3/2018 | Pitkanen et al. |
| 2018/0077144 A1 | 3/2018 | Gangawane et al. |
| 2018/0082050 A1 | 3/2018 | Flink et al. |
| 2018/0082256 A1 | 3/2018 | Tummuru et al. |
| 2018/0083771 A1* | 3/2018 | Bonnell ............... H04L 9/32 |
| 2018/0144153 A1 | 5/2018 | Pead |
| 2018/0173906 A1 | 6/2018 | Rodriguez et al. |
| 2018/0176017 A1 | 6/2018 | Rodriguez et al. |
| 2018/0205556 A1 | 7/2018 | Rieul |
| 2018/0240107 A1 | 8/2018 | Andrade |
| 2018/0248699 A1 | 8/2018 | Andrade |
| 2018/0270071 A1 | 9/2018 | Feraud et al. |
| 2018/0308098 A1 | 10/2018 | Ebrahimi |
| 2018/0343120 A1 | 11/2018 | Andrade |
| 2018/0359103 A1 | 12/2018 | Geupel |
| 2019/0005470 A1 | 1/2019 | Uhr et al. |
| 2019/0007381 A1* | 1/2019 | Isaacson ............... G06Q 20/12 |
| 2019/0149537 A1 | 5/2019 | Ebrahimi et al. |
| 2019/0163896 A1 | 5/2019 | Balaraman et al. |
| 2019/0182042 A1 | 6/2019 | Ebrahimi et al. |
| 2019/0228178 A1 | 7/2019 | Sharma et al. |
| 2019/0342096 A1 | 11/2019 | Starosielsky et al. |
| 2019/0372956 A1* | 12/2019 | Breu ............... H04L 9/0861 |
| 2020/0127826 A1 | 4/2020 | Ebrahimi et al. |
| 2020/0127832 A1 | 4/2020 | Ebrahimi |
| 2020/0145219 A1 | 5/2020 | Sebastian et al. |
| 2020/0186505 A1 | 6/2020 | Amar et al. |
| 2020/0265202 A1 | 8/2020 | Ebrahimi et al. |
| 2020/0267003 A1 | 8/2020 | Ebrahimi et al. |
| 2020/0344062 A1 | 10/2020 | Haldar et al. |
| 2021/0064780 A1 | 3/2021 | Riedel et al. |
| 2021/0192166 A1 | 6/2021 | Ebrahimi et al. |
| 2021/0334808 A1 | 10/2021 | Ebrahimi |
| 2021/0406495 A1 | 12/2021 | Ebrahimi et al. |
| 2022/0029799 A1 | 1/2022 | Subudhi et al. |
| 2022/0029802 A1 | 1/2022 | Ebrahimi et al. |
| 2022/0078178 A1 | 3/2022 | Ebrahimi et al. |
| 2022/0255737 A1 | 8/2022 | Ebrahimi et al. |
| 2022/0327304 A1 | 10/2022 | Ebrahimi et al. |
| 2022/0337419 A1 | 10/2022 | Ebrahimi |
| 2022/0342973 A1 | 10/2022 | Ebrahimi |
| 2022/0407720 A1 | 12/2022 | Ebrahimi et al. |

FOREIGN PATENT DOCUMENTS

| | | |
|---|---|---|
| JP | 2008518335 A | 5/2008 |
| JP | 2012114907 A | 6/2012 |
| KR | 20130055794 A | 5/2013 |
| WO | WO-2016179334 A1 | 11/2016 |
| WO | WO-2017152150 A1 | 9/2017 |
| WO | WO-2018145127 A1 | 8/2018 |
| WO | WO-2019113552 A1 | 6/2019 |

OTHER PUBLICATIONS

Biggs, J., "Your Next Passport Could Be on the Blockchain", Oct. 31, 2014, 6 pages.

(56) References Cited

OTHER PUBLICATIONS

Boneh, D. et al., (2001) "Short signatures from the Weil pairing," International Conference on the Theory and Application of Cryptology and Information Security, ASIACRYPT 2001: Advances in Cryptology, [Online], Retrieved from the Internet: URL: https://www.iacr.org/archive/asiacrypt2001/22480516.pdf, pp. 516-534.

Dillet, R., "Stampery Now Lets You Certify Documents Using the Blockchain and Your Real Identity," Nov. 20, 2015, 6 pages.

Drew-Cordell, "Developer Creates Blockchain Passport Technology Based on Bitcoin", Oct. 31, 2014, 16 pages.

Ellis, C., "Create Your Own Blockchain ID", Bitnation, Oct. 24, 2014, 14 pages.

Ellison, C. et al., (2000) "Ten risks of PKI: What you're not being told about public key infrastructure," Computer Security Journal, vol. 16, No. 1, pp. 1-8.

Extended European Search Report for European Application No. 16790050.5, dated Apr. 26, 2018, 10 pages.

Extended European Search Report for European Application No. 17760964.1, dated Oct. 24, 2019, 11 pages.

Extended European Search Report for European Application No. 18885688.4, dated Jul. 23, 2021, 5 pages.

Github, Inc., "World Citizenship, Creating Affordable Decentralised Passport Services Using Available Cryptographic Tools," (Oct. 2014), Retrieved from the Internet on Nov. 17, 2017, URL: https://github.com/MrChrisJ/World-Citizenship, 12 pages.

Gupta, V., "State in a Box—Identity Services Architecture," CheapID, 2006-2009, 42 pages.

International Search Report and Written Opinion for International Application No. PCT/US2016/030863, dated Sep. 14, 2016, 9 pages.

International Search Report and Written Opinion for International Application No. PCT/US2017/020829, dated Jul. 17, 2017, 12 pages.

International Search Report and Written Opinion for International Application No. PCT/US2018/017136, dated Apr. 26, 2018, 12 pages.

International Search Report and Written Opinion for International Application No. PCT/US2018/064623, dated May 14, 2019, 7 pages.

Kirk, J., "Could the Bitcoin network be used as an ultrasecure notary service?", IDG News Service, Computerworld, Inc., May 23, 2013, 3 pages.

Menezes, A. J. et al., Chapter 9: Handbook of Applied Cryptography, CRC Press, Boca Raton, FL, pp. 321-383 (Oct. 1996).

Nakamoto, S., "Bitcoin: A peer-to-peer electronic cash system," Retrieved from the Internet: <url:<a href="http://www.bitcoin.org">http://www.bitcoin.org, Jan. 2009, 9 pages</url:<a>.

Notice of Reasons for Refusal for Japanese Application No. 2018-510317, dated Sep. 1, 2020, 6 pages.

Office Action for European Application No. 16790050.5, dated Nov. 21, 2019, 7 pages.

Office Action for European Application No. 17760964.1, dated Oct. 20, 2020, 3 pages.

Office Action for U.S. Appl. No. 15/146,872, dated Jun. 15, 2017, 12 pages.

Office Action for U.S. Appl. No. 15/146,872, dated Sep. 27, 2016, 8 pages.

Office Action for U.S. Appl. No. 15/146,881, dated Oct. 13, 2016, 8 pages.

Office Action for U.S. Appl. No. 15/208,580, dated Jul. 7, 2017, 9 pages.

Office Action for U.S. Appl. No. 15/208,580, dated Mar. 21, 2017, 8 pages.

Office Action for U.S. Appl. No. 15/208,580, dated Oct. 25, 2017, 9 pages.

Office Action for U.S. Appl. No. 15/449,902, dated Jun. 19, 2019, 10 pages.

Office Action for U.S. Appl. No. 15/640,795, dated May 24, 2019, 8 pages.

Office Action for U.S. Appl. No. 15/784,093, dated Apr. 15, 2019, 11 pages.

Office Action for U.S. Appl. No. 15/784,093, dated Nov. 29, 2018, 9 pages.

Office Action for U.S. Appl. No. 15/878,353, dated Aug. 8, 2018, 14 pages.

Office Action for U.S. Appl. No. 16/018,773, dated Apr. 30, 2021, 45 pages.

Office Action for U.S. Appl. No. 16/018,773, dated Jul. 28, 2020, 34 pages.

Office Action for U.S. Appl. No. 16/019,411, dated Apr. 12, 2019, 12 pages.

Office Action for U.S. Appl. No. 16/019,411, dated Sep. 16, 2019, 9 pages.

Office Action for U.S. Appl. No. 16/214,029, dated Apr. 30, 2021, 22 pages.

Office Action for U.S. Appl. No. 16/214,029, dated Oct. 22, 2020, 24 pages.

Office Action for U.S. Appl. No. 16/227,632, dated Oct. 27, 2020, 9 pages.

Office Action for U.S. Appl. No. 16/656,459, dated Sep. 24, 2020, 8 pages.

Office Action for U.S. Appl. No. 16/697,110, dated Aug. 4, 2020, 7 pages.

Office Action for U.S. Appl. No. 16/697,131, dated Apr. 26, 2021, 6 pages.

Office Action for U.S. Appl. No. 16/697,131, dated Oct. 16, 2020, 12 pages.

Office Action for U.S. Appl. No. 16/986,817, dated Apr. 6, 2021, 10 pages.

Eminagaoglu, M. et al., "A Two-Factor Authentication System with QR Codes for Web and Mobile Applications," 2014 Fifth International Conference on Emerging Security Technologies, IEEE, Sep. 2014, pp. 105-112.

Extended European Search Report for European Application No. 21181229.2, dated Jan. 14, 2022, 9 pages.

Extended European Search Report for European Application No. 22156663.1, dated Sep. 7, 2022, 9 pages.

Office Action for U.S. Appl. No. 17/121,971, dated Sep. 15, 2022, 13 pages.

Office Action for U.S. Appl. No. 17/370,731, dated Apr. 25, 2022, 12 pages.

Office Action for U.S. Appl. No. 17/738,106, dated Jul. 11, 2022, 11 pages.

Panchamia, S. et al., "Passport, VISA and Immigration Management using Blockchain," 2017 23rd Annual Conference on Advanced Computing and Communications, 2018, 10 pages.

Partial European Search Report for European Application No. 22156663.1, dated Jun. 3, 2022, 10 pages.

Stallings, W. Chapter 10: Digital Signatures and Authentication Protocols In: Cryptography and network security: Principles and Practice, Second Edition, p. 299-314, 1998.

Vapen, A. et al., "2-clickAuth Optical Challenge-Response Authentication," 2010 International Conference on Availability, Reliability, and Security, IEEE, Piscataway, NJ, Feb. 2010, pp. 79-86.

Office Action for U.S. Appl. No. 17/480,673, dated Nov. 25, 2022, 6 pages.

Office Action for U.S. Appl. No. 17/680,762, dated Feb. 6, 2023, 11 pages.

Extended European Search Report for European Application No. 22020427.5, dated Dec. 14, 2022, 6 pages.

Office Action for U.S. Appl. No. 17/551,585, dated Mar. 6, 2023, 25 pages.

* cited by examiner

Simplified Bitcoin Block Chain

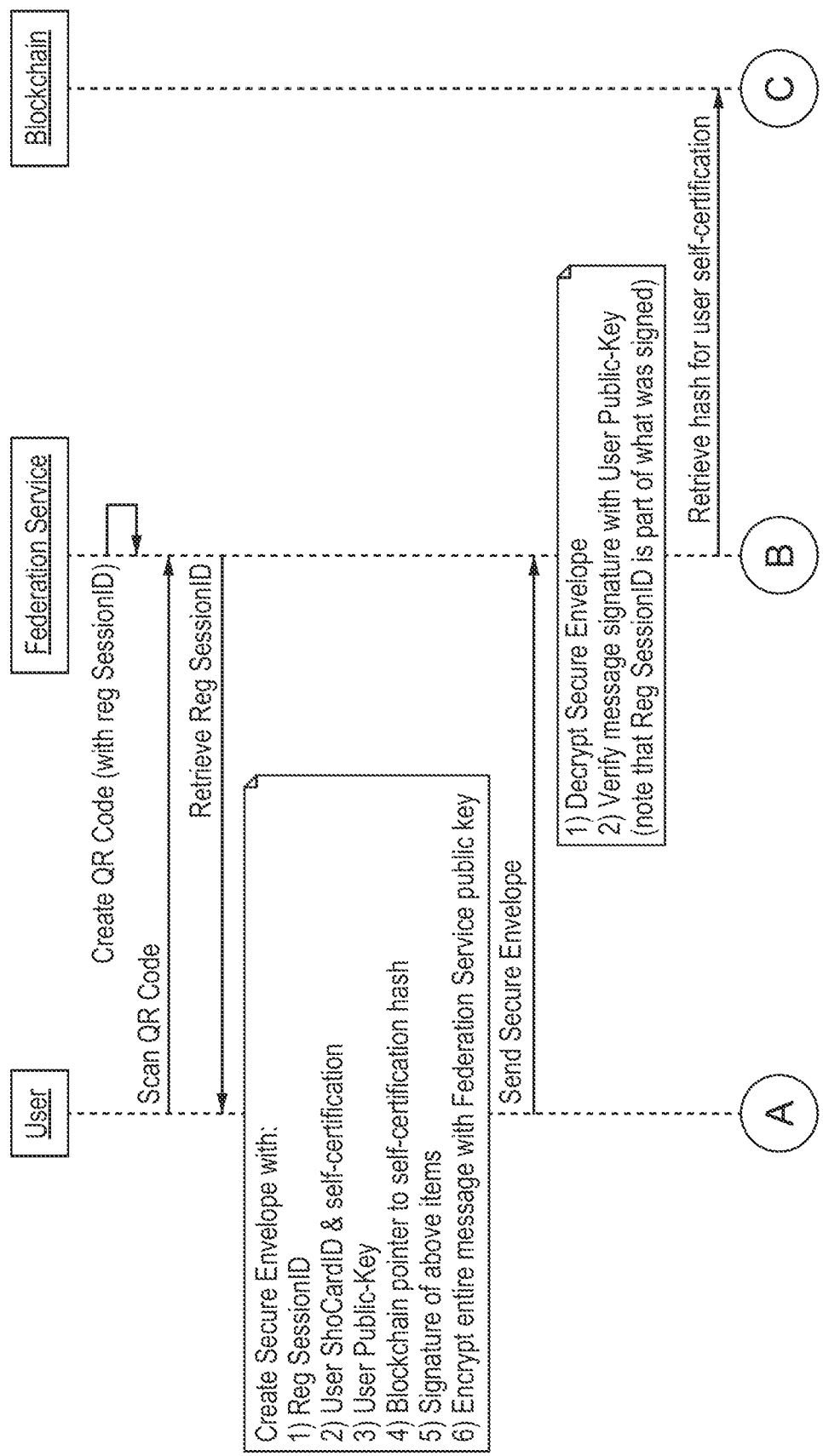

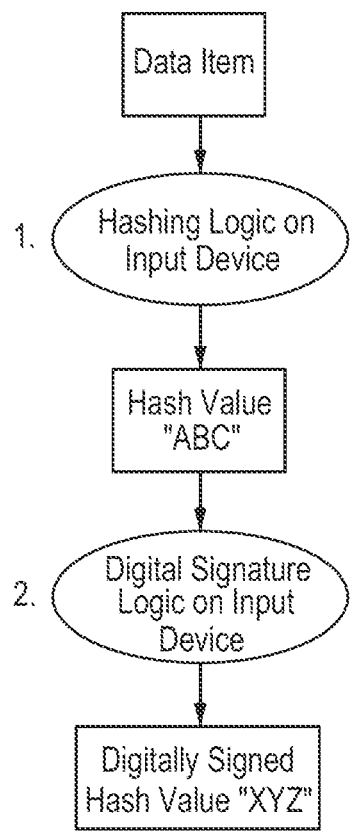
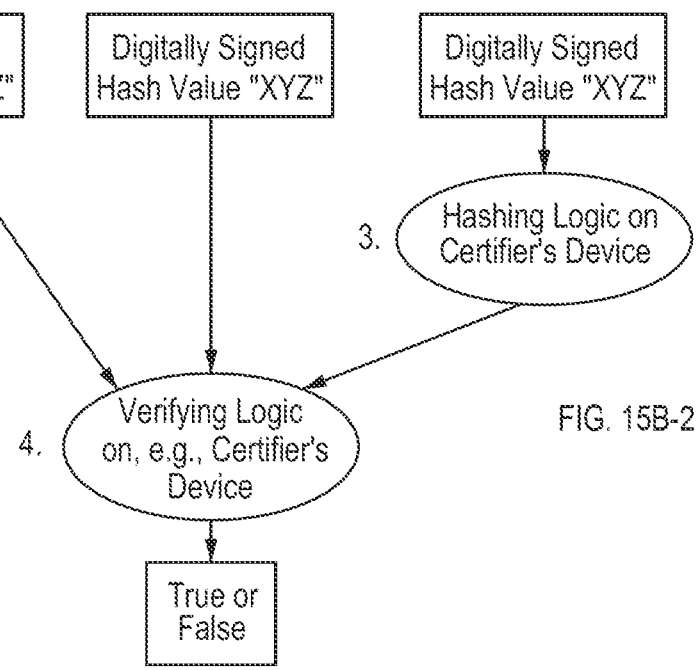
FIG. 15B-1
FIG. 15B-2
FIG. 15

BLOCKCHAIN ID CONNECT

CLAIM OF PRIORITY

This application is a continuation of U.S. patent application Ser. No. 16/656,477, filed Oct. 17, 2019, entitled "Blockchain ID Connect," now U.S. Pat. No. 10,979,227, which claims priority to and the benefit of U.S. Provisional App. Ser. No. 62/747,044 filed on Oct. 17, 2018, entitled "Blockchain ID Connect," the disclosure of each of which is incorporated herein by reference in its entirety for all purposes.

TECHNICAL FIELD

The present embodiments relate to methods, systems, and programs for managing the identify of users and of identifying those users to third parties.

BACKGROUND

Identity theft causes tens of billions of dollars in losses every year.

Today, using OpenID Connect, a federation server such as Facebook or Google can allow users to register with other sites using their ID credentials with the Federation Server and to authenticate them when they login using their credentials with the Federation Service (aka user-based Single Sign On). This alleviates the need for other sites to create and manage identities and authentication for those users. It also allows users to create one username/password with a federation server and use that over and over with other sites and avoid creating multiple IDs. One problem with this approach is that a breach with the federation server can expose the user on the Federation Server and its services, but also with all other sites that use that federation ID for authentication. Furthermore, users are able to manage their authentication to login, but have to use each session manually to log out. If someone steals their credentials, they can login to the Federation Server and other sites they have registered with and the user is not in control or aware of the logins.

It is in this context that embodiments arise.

SUMMARY

The present embodiments relate to solving one or more problems found in the related art, and specifically to provide for authentication and login. It should be appreciated that the present embodiments can be implemented in numerous ways, such as a method, an apparatus, a system, a device, or a computer program on a computer readable medium. Several embodiments are described below.

Using ShoCard's Blockchain ID Connect, users can be in control of every single session that gets created since they use their identity App to authenticate and not user names or passwords. Furthermore, they can easily know which sites they have registered with and be able to control both login as well as log out sessions directly from their App regardless of the device they have logged into. Sites using the Blockchain ID Connect to login, can check blockchain tokens through a smart contract to ensure the user is logged in. If the users logs out, the smart contract can show the current state in real-time.

This approach limits the control of hackers to hijack and take over users accounts in a federated system.

Embodiments of the present disclosure are described relating to methods and systems for Identity Management for enterprise using open standards such as SAML, management of enterprise data in encrypted manner by IT managers, delegation of authority and methods of compensation for sharing of identity information. In embodiments, methods and systems are described for blockchain ID connect. In particular, the ShoCard Blockchain ID Connect is a system based on the existing OpenID Connect and SAML interfaces that (a) removes the use of usernames and passwords and uses a mobile identity with verification codes on the blockchain instead, and (b) allows the user and the Federation Service to remotely manage all logged in sessions regardless of the device or location, in embodiments.

In one embodiment, a method for login is disclosed. The method including requesting from a user device a login to an entity through a federation server. The method including generating a session identifier at the federation server. The method including scanning and sending a QR code to the federation server for the login. The method including receiving the session identifier. The method including send secure envelope to the federation server including personal information of a user, wherein the federation server verifies the user has registered with the federation server based on the personal information. The method including receiving login token that is generated by the federation server, the login token associated with a smart contract generated by the federation server and stored on a blockchain. The method including sign the login token using a private key of the user. The method including send signed login token to a blockchain for inclusion in the smart contract. The method including receiving a transaction identifier from the blockchain. The method including sending transaction identifier to the federation server, wherein a session record is generated based on the login token. The federation server sends verification of the user to the entity to authorize a communication session between the user device and the entity.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIGS. 9A-9B is a data flow diagram illustrating BCID Connect implementing Federation service registration, in accordance with one embodiment of the present disclosure.

FIG. 15 (FIGS. 15B-1 and 15B-2) show a process for verifying hashed input data and a digital signature, in accordance with one embodiment of the present disclosure.

DETAILED DESCRIPTION

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Verification and Certification Using a Block Chain

In one embodiment, a ShoCard Identity Platform is a technology layer that interacts with a blockchain. The blockchain can then securely hold data used for certifying identity transactions. For example, a blockchain technology forms the heart of the cryptocurrency, Bitcoin. In addition, the blockchain technology is used by several integrated systems provided by ShoCard, e.g., for systems other than currency transactions, in embodiments of the present disclosure.

In one use example, to register with ShoCard, a certification process is processed. In one embodiment, a user can scan using a mobile device a driver's license or passport, and a software application or device grabs the individual field within that, such as name, license number, passport number, date of birth (or other data). The data may also be gathered individually or manually. The data is then processed to produce a hash of the data. In this example, the private key that is on the mobile device can be used to create a digital signature of that hash, and that's the piece of data that is stored to the blockchain. In one configuration, the various fields are put together in one record to create an ID for that user.

If the user then provides the raw data with a public key and a pointer to that record on the blockchain, the data can be verified. This provides a correlation between the data that the user has on the mobile device and what's on the blockchain.

In still other embodiments, following the registration process, users can be certified by some other trusted party such as a bank or KYC checking company, which then issues a certification for the user. By way of example, these certifiers can use their own private key to write the records on the blockchain, pointing to that user's record entry that's also on the blockchain. This may be referred to as a ShoCard ID, or generally, the User ID. In this example, there are two steps: one is the registration where hash signatures of the individual fields are placed on the blockchain; and the second one is a certification.

Figure 1:
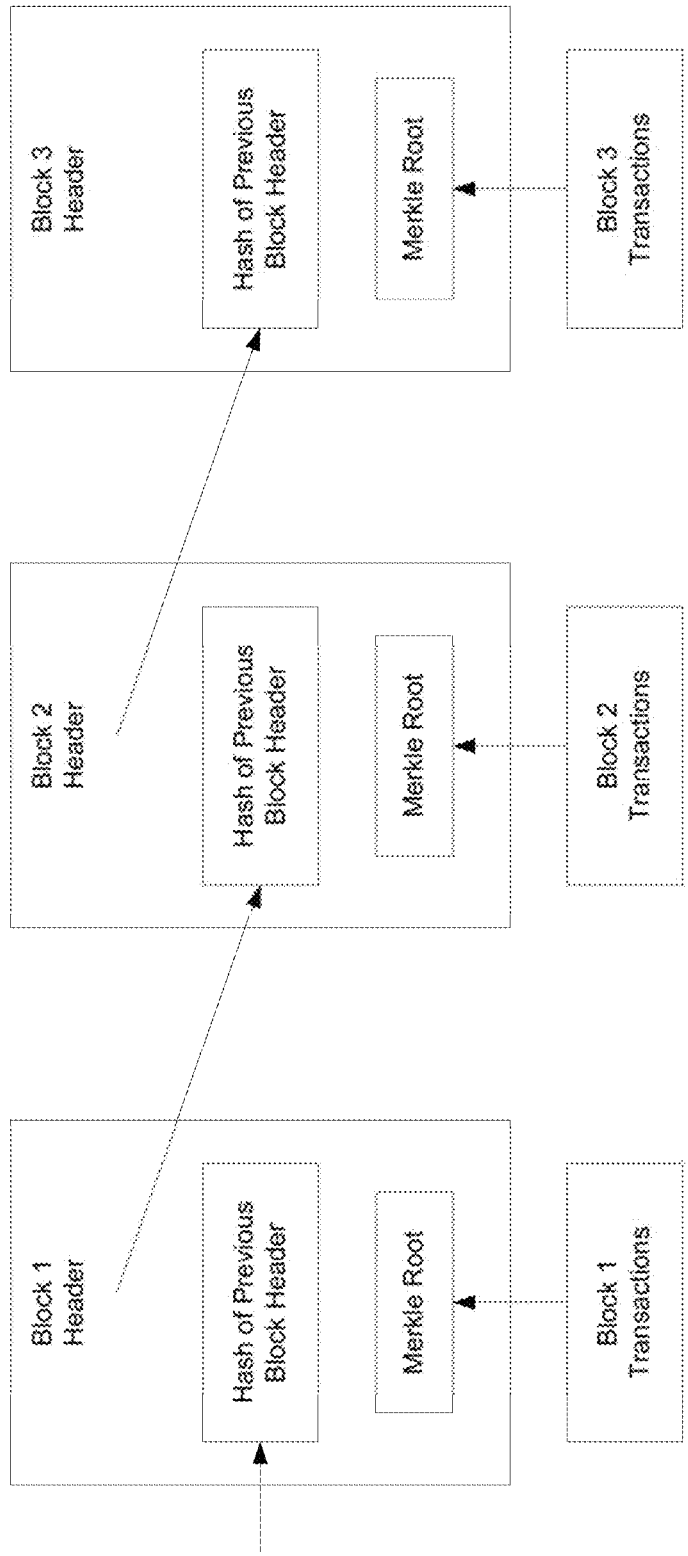
FIG. 1 illustrates the implementation of a blockchain to ensure the integrity of the data embedded within, in accordance with one embodiment of the present disclosure.

FIG. 1 shows a simplified version of a block chain. A block of one or more new transactions is collected into the transaction data part of a block. Copies of each transaction are hashed, and the hashes are then paired, hashed, paired again, and hashed again until a single hash remains, the merkle root of a merkle tree. The merkle root is stored in the block header. Each block also stores the hash of the previous block's header, chaining the blocks together. This ensures a transaction cannot be modified without modifying the block that records it and all following blocks.

Understanding the basics discussed above, the system and methods process operations referred to as "sealing" and "certifying." Sealing is the process of hashing and encrypting the user's ShoCard data and storing it in the blockchain. Once it is sealed in the blockchain, the data becomes a permanent record. The user may change his or her ShoCard ID, but the user will have to re-Seal it, and create a new blockchain record. No readable information is stored in the blockchain; instead, an indecipherable hash is stored that can be unlocked by a corresponding private key, which is always controlled by the user, in one embodiment.

"Certifying" the ShoCard ID is the process of another party acknowledging the accuracy of your ShoCard ID and marking it so they will recognize it as accurate again in the future without having to see any other evidence of identity beyond your ShoCard ID. To certify a ShoCard ID, you send your encrypted ShoCard ID to the certifier. The certifier will decrypt it and match the hash the user sent them to the hash stored in the blockchain. This proves that the user has the private keys that created both records. If the certifier is satisfied that the user is as identified, the certifier can create a new record with their own private keys that references the user's ShoCard ID. In the future, when the user presents his or her ShoCard ID, they will check their certification to make sure the user is presenting the same ShoCard ID, previously certified.

Figure 2:
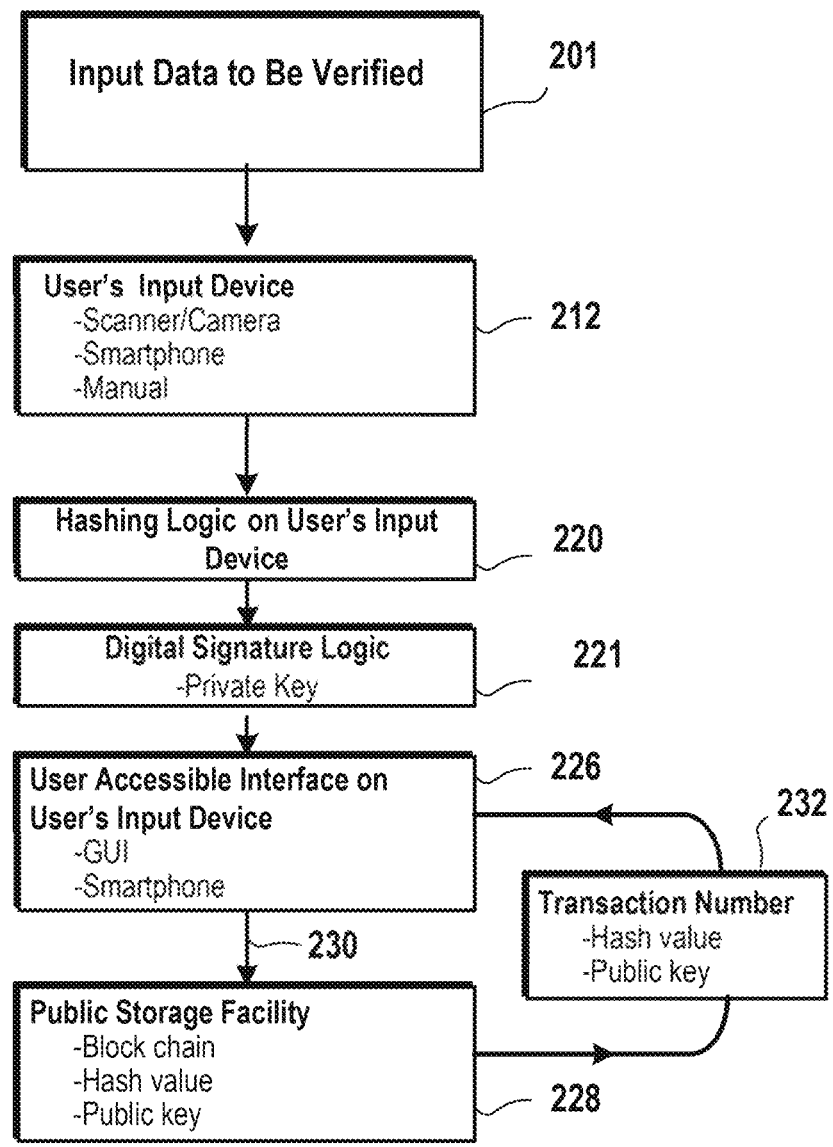
FIG. 2 shows a simplified block diagram of a system and method for sealing any input data in a public storage facility, in accordance with one embodiment of the present disclosure.

FIG. 2 shows a simplified block diagram of a system and method for sealing any input data in a public storage facility. As noted above, the operations to be performed by the hashing logic 220 can proceed directly after receiving the user information from the input device 212. In this embodiment, the hashing logic 220 is used for hashing the input data (e.g., personal information collected) to provide or generate a hash value. The hash value is sometimes referred to as "hash data," that is generated by an algorithm. In an example embodiment, hashing logic 220 might be software, firmware, hardware, or any combination thereof, and consist of one or more hashing algorithms, e.g., a Secure Hash Algorithm (SHA) algorithm. Hashing logic 220 passes the hash value to digital-signature logic 221, which performs a digital signature on the hash value, using the private key on the input device 212. In an example embodiment, digital-signature logic 221 might be a component (or module) of encryption logic. In other embodiments, the digital-signature logic 221 may be defined by separate code, firmware, and/or hardware.

In one embodiment, the digital-signature logic 221 then passes the signed hash value and the public key to a user accessible interface 226 (e.g., a graphical user interface or GUI), which might be other software running on the input device 212. In an example embodiment, the user accessible interface 226 might be part of an application or app that includes encryption logic, hashing logic 220, and digital-signature logic 221, and/or other modules or code. The user accessible interface 226 might be used by the user to transmit the digitally signed hash value and the public key to a public storage facility 228 via a line 230, and receives back from the public storage facility 228 a transaction number 232 corresponding to the transmitted hash value and public key. In an alternative example embodiment, the signed hash value might be transmitted to public storage facility 228 by the user and persons retrieving the signed hash value might obtain the public key from elsewhere (e.g., the user, a public database, an Internet repository, a website, etc.). As is well known, there is no need to keep public keys secure, and in fact, the algorithms using public/private key pairs are design to enable full sharing of public keys. The private key, on the other hand, is kept secure, as noted above.

In one embodiment, the public storage facility 228 can take the form of a block chain (e.g., in a bitcoin online payment system) or any other public or private distributed database. The public storage facility 228 is connected to a communication link via a line and can be adapted to communicate over a public computer network, the internet, an intranet, an extranet, or any private communication network. Broadly speaking, the public storage facility 228 is accessible by any device that has an Internet connection over a network.

As indicated above, in an example embodiment, the input data might be hashed and the resulting hash value might be signed with a digital signature, created using a private key paired with a public key, before transmission, optionally along with the public key, from the input device (e.g., a user's smartphone) 212 to the public storage facility 228 for storage. The user accessible interface 226 is thus adapted to "seal" the signed hash value and the public key in the public storage facility 228. In one embodiment, once the hash value, and, optionally, the public key of the user is written to the block chain in a transaction, a later verification may be made if another party is able to hash the same input data.

Figure 3:
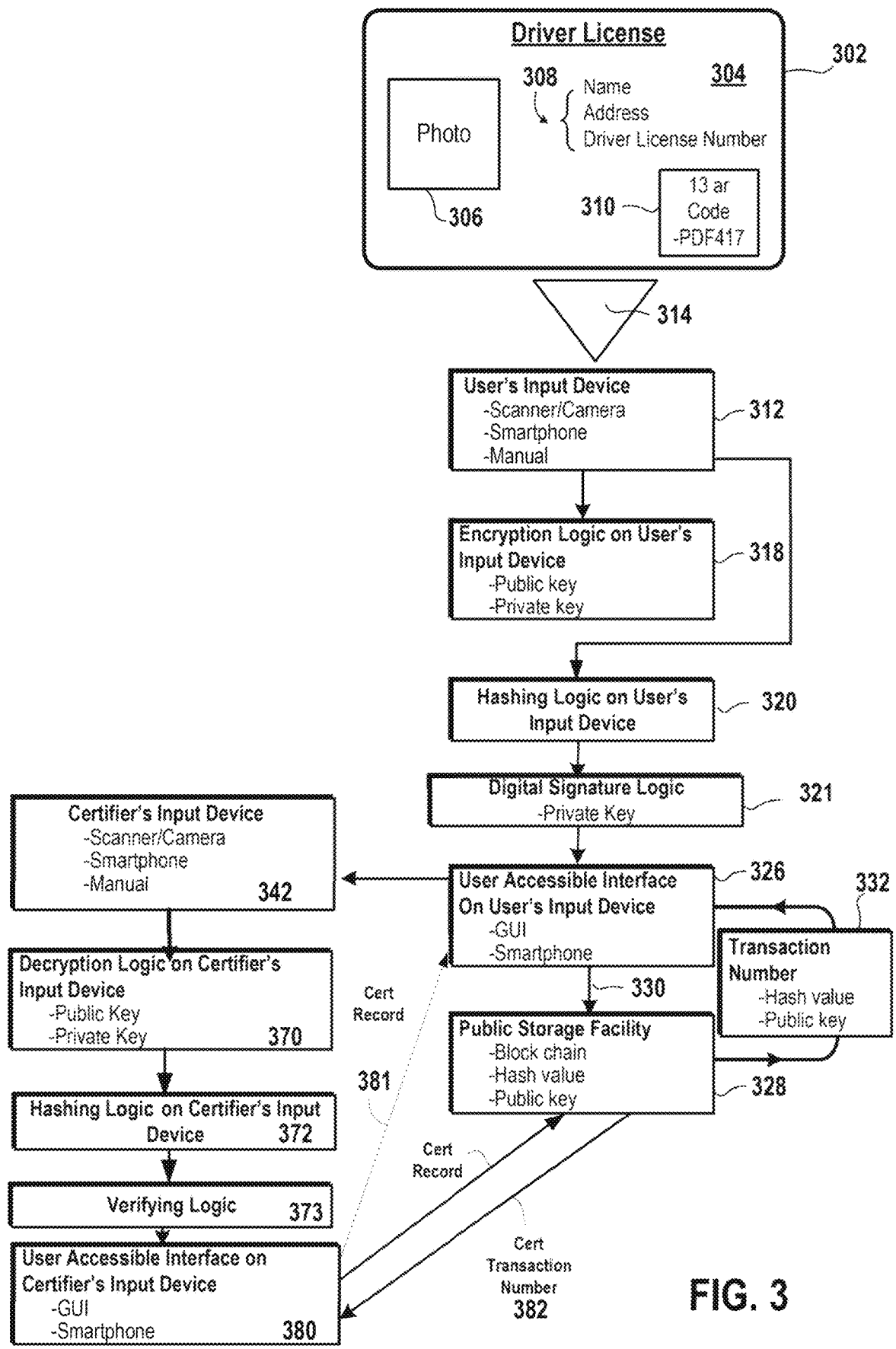
FIG. 3 shows a simplified block diagram of a system and method for certifying an identity of a person, in accordance with one embodiment of the disclosure.

FIG. 3 shows a simplified block diagram for a certification method for managing the identity of a user in a public storage facility 328. By way of example, an identification card 302 may be used. In other embodiments, other forms of identification, which may be digital or non-digital may be used. In the example of the identification card 302, personal data 304 is contained thereon, which identifies the user. The input data can include a photo 306 of the user; the user's name, address and driver license number 308, and/or a bar code 310 or similar computer code for storing, scanning and/or retrieving additional data. Such coding can include PDF417 codes, QR codes, and other such codes. However, it is not necessary to have such code and the identification card may have human-readable text strings, in one embodiment. As noted above, the identification card 302 may also take a physical or a digital form and the information can be retrieved either through scanning a code as described, performing Optical Character Recognition (OCR) on text strings, digitally transferring a digital identification card from one system to another, manually inputting the information using a keyboard, manually inputting the information using voice recognition, etc., in example embodiments.

The identification card 302 can be a government issued form of identification such as a driver license, passport, employee badge, military identification, political documentation, or the like. The identification card 302 can also be a privately issued form of identification such as a student ID, library card, social club car, or any other form of identification issued by a third party.

In one embodiment, as indicated by triangle 314, an input device 312 may be used to input such personal data from the identification card 302 to provide input data. Input device 312 can take many forms. For example, input device 312 can be a digital scanner, digital camera, or smartphone (e.g., with the camera commonly found in smartphones) for reading data from the identification card 302, including any codes appearing on the card 302. The input device 312 can also be a device for manually inputting personal data such as a keyboard, touchscreen, voice recognition device, handwriting recognition device, or other manual input device.

As shown in FIG. 3, the input data can be optionally encrypted by encryption logic 318 and securely stored. In one implementation, the input data is transferred directly to hashing logic 320, without passing through encryption logic 318. For ease of understanding, the operations of the optional encryption logic 318 will be discussed first, and then the operations processed by the hashing logic 320. As such, the process may proceed directly from receiving the user information via 312 to the hashing logic 320.

The input data collected from the input device 312 (e.g., a user's smartphone) is passed to encryption logic 318 on input device 312. In an example embodiment, encryption logic 318 might include software, firmware, hardware, or any combination thereof, and consist of one or more encryption algorithms, e.g., an RSA encryption algorithm. Encryption logic 318 encrypts the input data with a public key to provide encrypted data. The public key is paired with an associated private key as is conventional when generating such keys using an RSA encryption algorithm, an Elliptic Curve Digital Signature Algorithm (ECDSA), or other encryption algorithm known to those skilled in the art. This encrypted data can then be stored locally on the input device 312 for added security. It can then accessed with the private key of the user on the input device 312, which might be stored in a more secure part of input device 212, e.g., "the Keychain", if input device 312 is an iOS (e.g., operating system used by devices made by Apple, Inc.) smartphone. If the device is of a different type, e.g., one using an Android OS (e.g., operating system by Google, Inc.), similar secure device storage methods may be used. In this manner, for added security, the private key is not compromised and is kept safely on the input device 312. It should be understood that the private key may be stored on another device, but similar or additional security should be processed to ensure that the private key is not compromised.

As noted above, the operations to be performed by the hashing logic 320 can proceed directly after receiving the input data from the input device 312. In this embodiment, the hashing logic 320 is used for hashing the input data (or selected fields of the input data or personal data) to provide or generate a hash value. The hash value is sometimes referred to as "hash data," that is generated by an algorithm. In an example embodiment, hashing logic 320 might be software, firmware, hardware, or any combination thereof, and consist of one or more hashing algorithms, e.g., a Secure Hash Algorithm (SHA) algorithm. Hashing logic 320 passes the hash value to digital-signature logic 321, which performs a digital signature on the hash value, using the private key on the input device 312. In an example embodiment, digital-signature logic 321 might be a component (or module) of encryption logic 318. In other embodiments, the digital-signature logic 321 may be defined by separate code, firmware, and/or hardware.

In one embodiment, the digital-signature logic 321 then passes the signed hash value and the public key to a user accessible interface 326 (e.g., a graphical user interface or GUI), which might be other software running on the input device 312. In an example embodiment, the user accessible interface 326 might be part of an application or app that includes encryption logic 318, hashing logic 320, and digital-signature logic 321, and/or other modules or code. The user accessible interface 326 might be used by the user to transmit the digitally signed hash value and, optionally, the public key to a public storage facility 328 via a line 330, and receive back from the public storage facility 328 a transaction number 332 corresponding to the transmitted hash value and public key.

In one embodiment, the public storage facility 328 can take the form of a block chain (e.g., in a bitcoin online payment system) or any other public or private distributed database. The public storage facility 328 is connected to a communication link via a line and can be adapted to communicate over a public computer network, the internet, an intranet, an extranet, or any private communication network. Broadly speaking, the public storage facility 328 is accessible by any device that has an Internet connection over a network.

As indicated above, in an example embodiment, the input data (or selected fields of the input data) might be hashed and the resulting hash value might be signed with a digital signature, created using a private key paired with a public key, before transmission, along with, optionally, the public key, from the input device (e.g., a user's smartphone) 312 to the public storage facility 328 for storage. The user accessible interface 326 is thus adapted to "seal" the signed hash value and the public key in the public storage facility 328. In one embodiment, once the hash value, and, optionally, the public key of the user is written to the block chain in a transaction, a later verification may be made if another party is able to hash the same input data.

The user accessible interface 326 (e.g., a GUI) can be controllable by the user of the input device 312 to encrypt and provide the transaction number 332, the input data (or selected fields of the input data), and, optionally, the public key to an input device 342 (e.g., a smartphone) of a certifier. In an example embodiment, the encryption might be performed by the encryption logic 318 using a public key of a certifier paired with a private key of the certifier. Then, coding logic on the input device 312 might code the encrypted transaction number 332, the input data (or selected fields of the input data), and, optionally, the public key into a barcode or QR code and the certifier might use input device 342 to scan the barcode or QR code and decode it to gain access to the encrypted items. Thereafter, the certifier might decrypt the encrypted items using the private key of the certifier and verify them, e.g., using a "verify" function call to an RSA algorithm as explained in further detail below.

Once the certifier's input device 342 receives the barcode or QR code, decoding logic on the certifier's input device 312 might decode the barcode or QR code and decryption logic 370 on the certifier's input device 342 might use the certifier's private key to decrypt the encrypted items. In an example embodiment, decryption logic 370 might be a component (or module) of more general encryption logic. In one embodiment, the decrypted input data (or selected fields of the input data) might be hashed into a hash value by hashing logic 372 on the certifier's input device 342, using the same hashing algorithm that was used to create the hash value that was digitally signed by the user. And the decrypted transaction number 332 might be used by a user accessible interface 380 (e.g., a GUI) to access the public storage facility 328 (e.g., the block chain) and retrieve the signed hash value and public key of the user. The retrieved signed hash value, the generated hash value, and the retrieved or obtained public key might then be input to verifying logic 373 for verification (e.g., through a "verify" function call to an RSA algorithm), which outputs a "true" value if the two hash values are the same and the public key is associated with the signature or a "false" value if the two hash values are not the same or the public key is not associated with the signature. In an example embodiment, verifying logic 373 might be a component (or module) of decryption logic 370. In another embodiment, the verifying logic 373 may be a separate module, software, firmware and/or hardware. As indicated above, in an example embodiment, the public key of the user might be obtained from some other source than the public storage facility 328 (e.g., from the user), in an example embodiment.

In one embodiment, a system for verifying the identity of a user is described, and includes the user's input device 312. The user's input device 312 is configured for receiving personal data identifying the user from an identification card, for example, that defines input data. The input device may be configured to execute an encrypting machine configured for encrypting the input data using a public key of the user, wherein the public key is paired with a private key of the user. The input device may be configured to execute a hashing machine configured for hashing the encrypted input data to provide a hash value. The input device may be configured for executing a user accessible interface for transmitting the hash value and the public key to a public storage facility (e.g., blockchain) and for receiving back from the public storage facility a transaction number corresponding to the hash value and the public key. The transaction number and the public key may be used for purposes of verifying the identity of the user without decrypting the encrypted input data. In particular, a receiver of the transmitted input data uses the transaction number and the public key of the user to perform an encryption of the input data, and determine whether the identity is verified. That is, the receiver performs the same processes as the user's input device 312 (e.g., encryption, hashing, etc.) to verify that the transmitted input data (as received by the receiver) is the same data used for storing the hash value in the public storage facility corresponding to the same transaction number. Specifically, the process of verifying an identity of a user by signing, using a public key of the user, a hash value of the personal identifying data of the user, and then sending that signed value and the public key to a public storage facility and receiving from the public storage facility a transaction number corresponding to the hash value and the public key, and then having a receiver (e.g., of a verifier) receive the personal identifying data of the user, and the transaction number and the public key of the user, then performing an encryption of the personal identifying data of the user, and determining whether the identity is verified, without decrypting the encrypted data (e.g., stored to the blockchain) (because the newly encrypted data should match that stored to the blockchain, or be verifiable to match that stored to the blockchain).

Blockchain ID Connect

Current federation systems use methods such as SAML or OpenID Connect and OAuth to provide Federation Services for Single Sign On (SSO). SAML is more frequently used for enterprise solutions while OpenID and its permutations are used for more consumer based applications.

In all of these paradigms, the Federation Server is used to register a user with a Service Provider (SP) and in the process, may provision the user and provide the necessary information for that provisioning such as the user's name, email address and other pertinent information. Subsequent to the registration, the user may login using the Federation Service. This is often enabled by introducing a special button, a specific URL or a user identification that redirects the login process from the SP to the Federation Service. The Federation Service then authenticates the user and passes a token to the SP with an identification of the user (e.g., their email address). The SP then begins a new session for that user.

This process has great advantages as it simplifies the login process for the user. The user remembers one username or password to login. Furthermore, their identification information is not spread among various SPs. Such identifying information usually accompanies more than a username and a password. It usually also includes recovery parameters such as "secret" questions, second factor or other information that the user can volunteer to recover and reset their password. Since most users use similar parameters for all of their logins, a breach in one SPs data store of identifying information can potentially provide the necessary information for a hacker to go through other sites that the user has registered at and get access to those accounts as well. Hence, trusting a more secure Federation Service such as Facebook, Google, Microsoft, Okta and OneLogin can keep the data more secure.

However, a breach with a Federation Service can cost the user even greater exposure than a breach of identity data at a standalone service provider. All SPs that use a compromised federation account are exposed.

Even when there is no breach, the ability of a user to control their logged in sessions is rather limited. This is further compounded when a user utilizes multiple devices for different services. For example, a user may use a Federation Service to login to spodify.com on a set-top box on their home entertainment, Washington Post on their PC browser and cars.com on their mobile-phone. Today, the user would have to log out of each session manually even if Federation Service was used to login to them. If the user leaves the location of the device—for example the family room where spodify was logged into—another person can have access to their account as they remain logged in.

The ShoCard Blockchain ID Connect is a system based on the existing OpenID Connect and SAML interfaces that (a) removes the use of usernames and passwords and uses a mobile identity with verification codes on the blockchain instead, and (b) allows the user and the Federation Service to remotely manage all logged in sessions regardless of the device or location.

1. Registering a Mobile Identity with the Federation Service.

The user is assumed to have downloaded their identity App and set it up using the Wizard (which may be incorporated into a Federation Service provider's existing App using the ShoCard SDK). This provides the basic identity information on the user maintained on the device. Additionally, when the App is first initialized, a private/public key pair is created for the user along with a blockchain identity address that is referred to as their ShoCardID.

The user can pair this ID with their Federation Service by scanning a QR Code, entering a code from the Federation Service account setup or other means that informs the Federation Service on a logged-in user that the mobile identity refers to that user.

Alternatively, the Federation Service can create a new user without ever utilizing a username or password. The user in that case would register with the Federation Service by scanning a QR Code, entering a code or a similar means to register itself and pass the necessary identifying information for the registration.

In either case, a user profile on the Federation Service will be linked to the user's ShoCardID. The Federation Service will also create a certificate on that user's ShoCardID as a proof that it has validated the user and knows who that user is. This certificate is shared with the user and it's hash written to a smart contact on the blockchain.

This user can now login to the Federation Service using the mobile identity by simply scanning a QR Code or equivalent on the login page. No usernames or passwords are necessary. Other documentation, including the patents mentioned above detail the secure interface used for exchanging data between the mobile App and the server and the login process. These details are not outlined in this document.

Figure 9B:
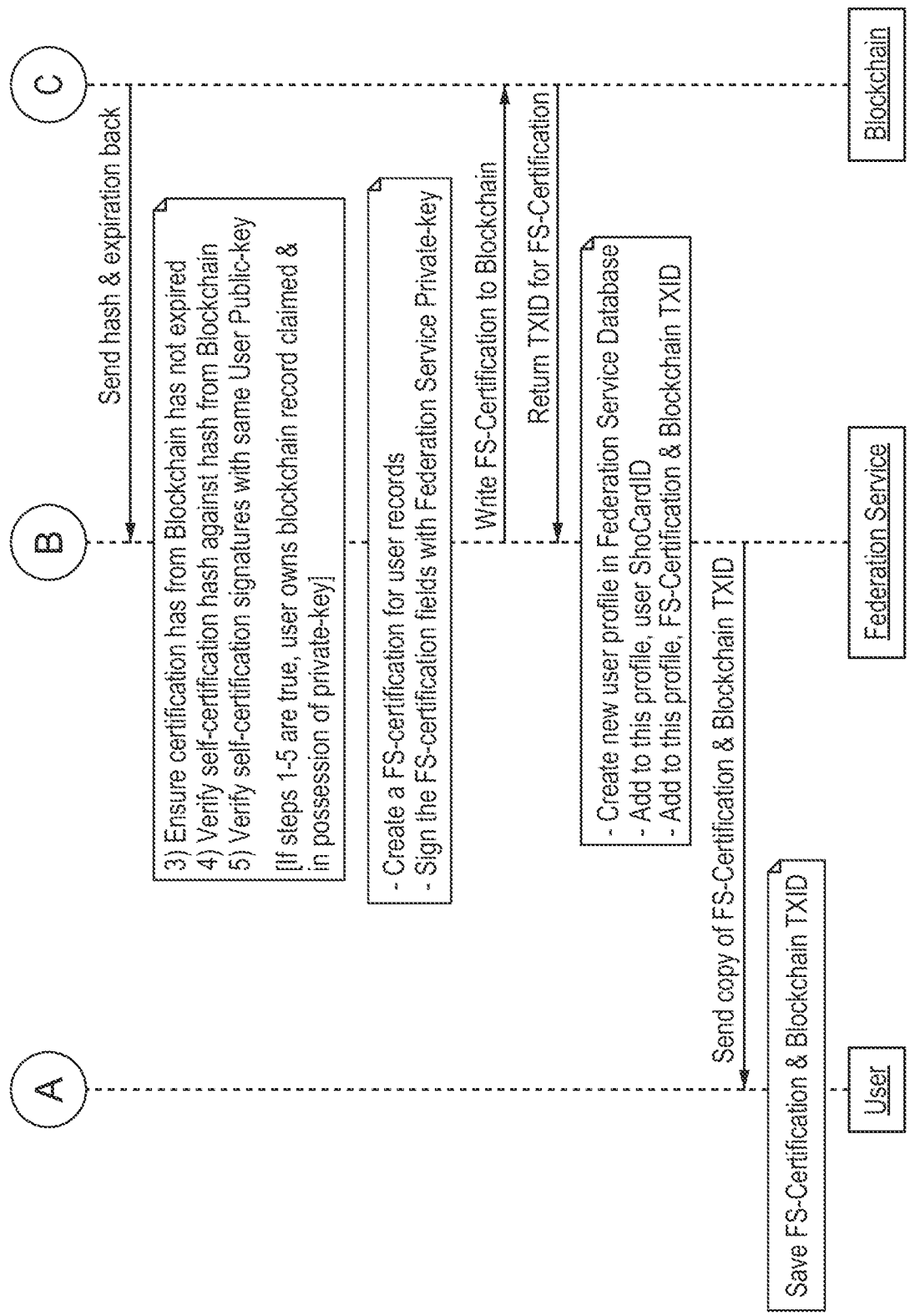

FIGS. 9A-9B is a data flow diagram illustrating BCID Connect implementing Federation service registration, in accordance with one embodiment of the present disclosure.

2. Registering an ID with a Service Provider.

Figure 4:
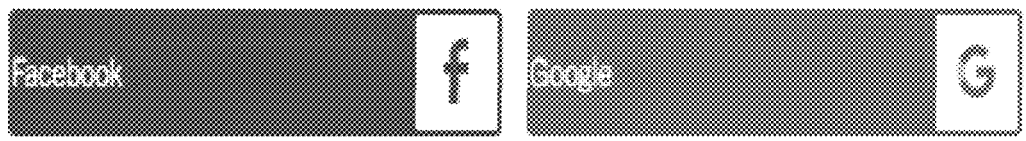
FIG. 4 illustrates third party service providers allowing a user to login to their corresponding site via a link, such as the link to Facebook, or the link to Google, using an ID of the user, in accordance with one embodiment of the present disclosure.

Similar to registering with Open ID, an option needs to be made available for third party service providers to allow a user to register their ID with their site and subsequently login with it. This can be enabled through a link or button very similar to existing solutions with Open ID such as those shown in FIG. 4.

The Federation Service provider will dictate what the button for the Blockchain ID Connect will look like, in one embodiment.

Figure 5:
FIG. 5 illustrates a registration QR page, in accordance with one embodiment of the present disclosure.

When the user selects the Blockchain ID Connect option, the Federation Service will present the user with a login screen that it controls. This presents the user with a QR Code (or equivalent) option and the user will be asked to scan the QR Code to register. The QR Code will include the parameters that the registration requires such as a user's name. FIG. 5 is an example of how a registration QR Page could look like.

When the user's App scans the registration QR Code, the App reads the request and can present the user with the information requested and ask for approval to share the data. This can be done in a modal dialog box and alternatively ask the user to use TouchID, FaceID, a PIN or equivalent to approve sharing of the data with the site. Once the user approves the request, a Secure Envelope signed by the user's private-key along with the user's certification records are sent to the Federation Service.

Figure 10A:
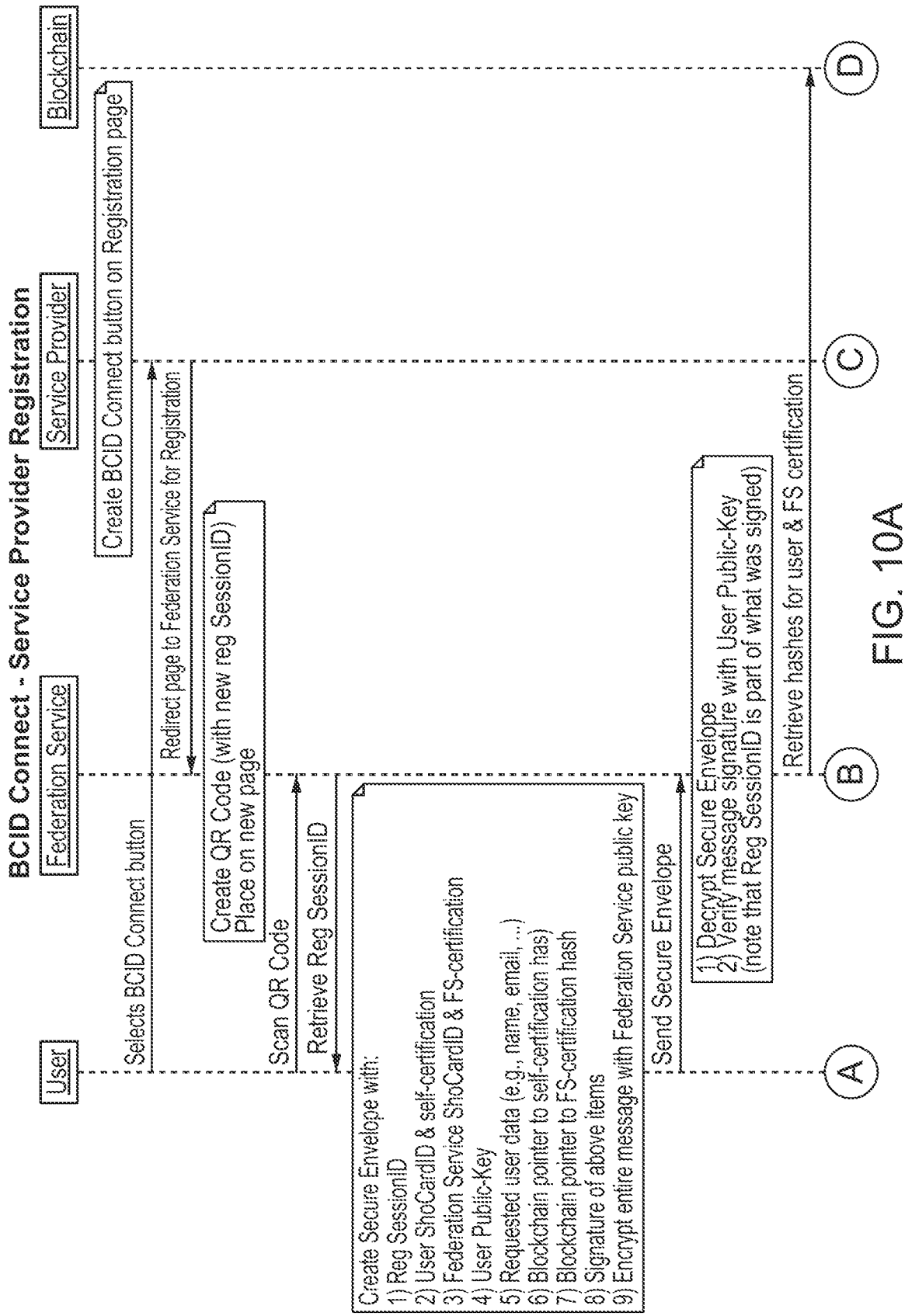
FIGS. 10A-10B is a data flow diagram illustrating BCID Connect implementing service provider registration, in accordance with one embodiment of the present disclosure.
Figure 10B:
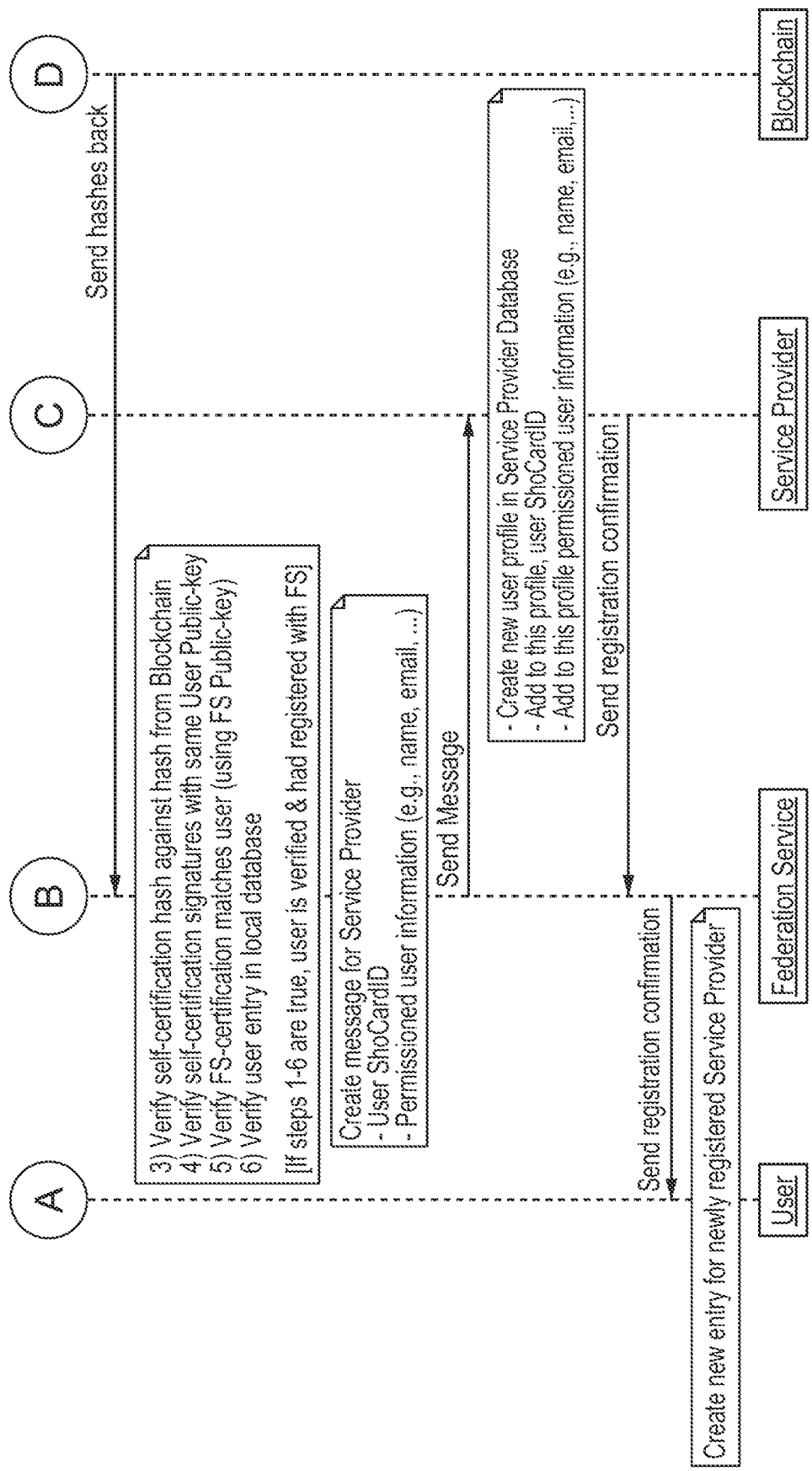

FIGS. 10A-10B is a data flow diagram illustrating BCID Connect implementing service provider registration, in accordance with one embodiment of the present disclosure.

2A. Signup Using Federation Service.

If the signup is done using the Federation Service, the Secure Envelope is encrypted with the public key of the Federation Service. In this case, the Federation Service will decrypt the envelope, verifies the signature of the message and ensures that it matches the certificates on the blockchain. It then sends the user data (e.g., name and email), along with the ShoCardID of the user (their electronic blockchain ID) to the Service Provider. In the above example, that would be Washington Post. At this point, the Service Provider can create a new profile for the user with the information supplied and optionally ask the user for additional information as may be needed for the registration. The Service Provider will then send a Signup confirmation message to the Federation Service which will be relayed back to the user in another Secure Envelope.

2B. Signup Using Service Provider Using Blockchain Directly.

In this scenario, the Federation Service is not able to decipher the contents of the Secure Envelope as it is encrypted with the public key of the Service Provider. It simply forwards the request to the Service Provider. The Service Provider decrypts the message, verifies the signature of the message and ensures that it matches the certificates on the blockchain. It can then create a new profile for the user with the information supplied and optionally ask the user for additional information as may be needed for the registration.

It then sends an acknowledgment in a separate Secure Envelope back to the user confirming her registration.

Figure 6:
FIG. 6 illustrates a screen shot of a registration of a user to one or more sites and/or their corresponding entities, in accordance with one embodiment of the present disclosure.

Once the acknowledgment is received by the user, it can display the new registration on its mobile App registration view similar to the image and/or screen shot shown in FIG. 6.

3. Login into a Service Provider.

The user is now registered with the site and is able to login. It can invoke the login page very similar to the registration process described above, by choosing the Federation Service option it used. In this case, the Service Provider will ask the Federation Service for a unique SessionID. This SessionID will establish a logged in session if the user is able to successfully authenticate herself. The SessionID is passed to the Federation Service as the login page is redirected to the Federation Server.

Figure 7:
FIG. 7 illustrates a login authorization QR page, in accordance with one embodiment of the present disclosure.

The Federation Service will present the user with a login page very similar to registration page, but with a different QR. The QR code asks the user to authorize login, as shown in FIG. 7. The QR code also contains the unique SessionID that was shared between the Service Provider and the Federation Service.

When the user's App scans the Login QR Code, the App reads the request and can present the user with the login request information and details on the App and ask for approval. This can be done in a modal dialog box and alternatively ask the user to use TouchID, FaceID, a PIN or equivalent to approve sharing of the data with the site. Once the user approves the request, a Secure Envelope signed by the user's private-key along with the user's certification records are sent to the Federation Service.

The Federation Service will validate the user's identity with the ID that was registered with it before by validating the certifications of the user on the blockchain. It then creates a unique session Token for the user, signs that token and places it in a smart contract on the blockchain. It shares that token and the pointer to the smart contract with the user. The user also signs the token and it too writes the token to a smart contract on the blockchain. (These can be two separate smart contracts or a dual signature single smart contract.).

The user's App, then creates a Secure Envelope and sends it to the ShoCardID that was present in the QR Code it registered with. This Secure Envelope includes the user's ShoCardID, the original SessionID from the QR Code, the session Token, the certifications for her identity and the token and blockchain pointers. The Secure Envelope is signed with the user's private-key and encrypted with the Federation Service's public key. It is then sent to the Federation Service.

Figure 11A:
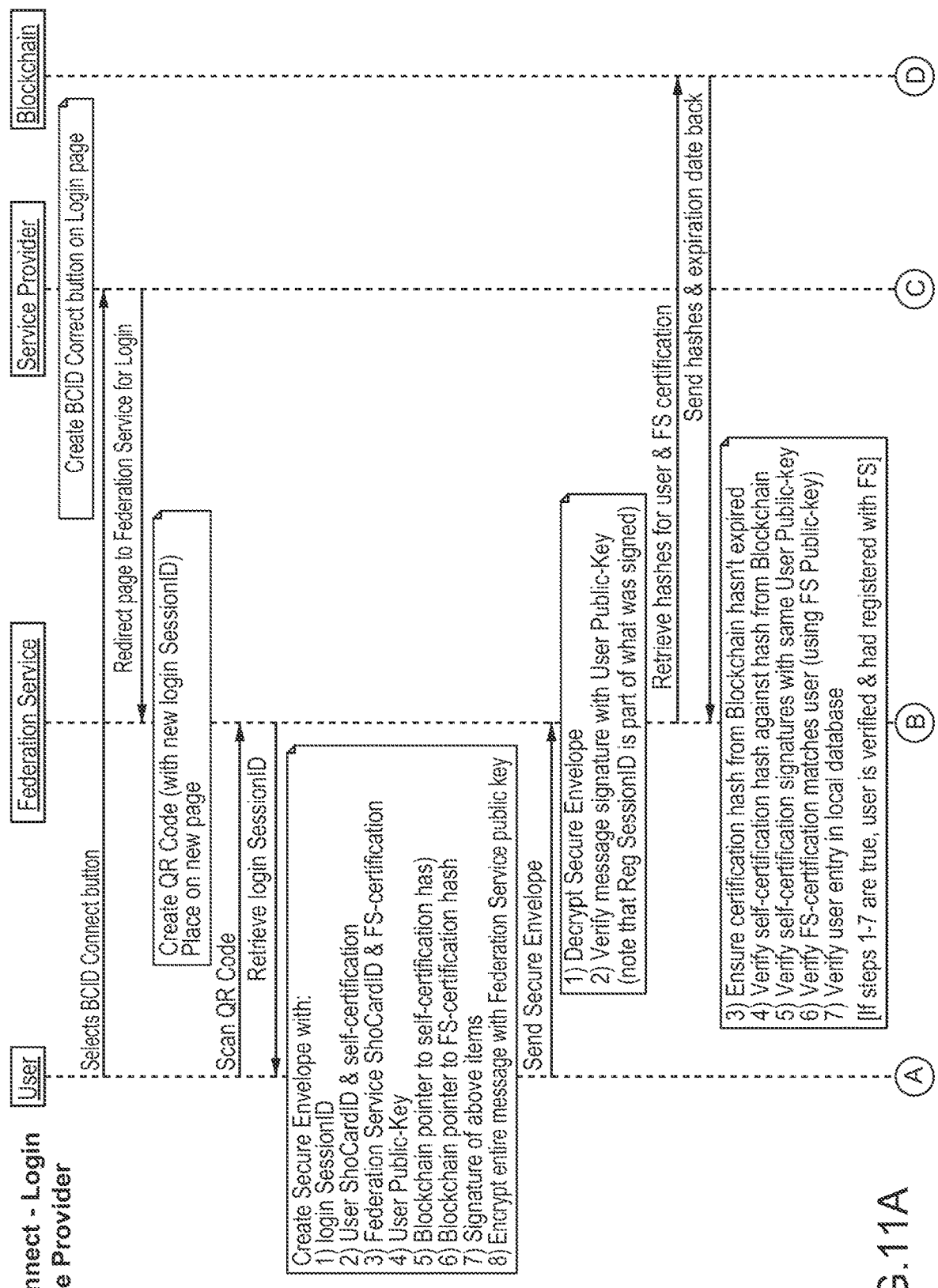
FIGS. 11A-11B is a data flow diagram illustrating BCID Connect implementing login to a service provider, in accordance with one embodiment of the present disclosure.
Figure 11B:
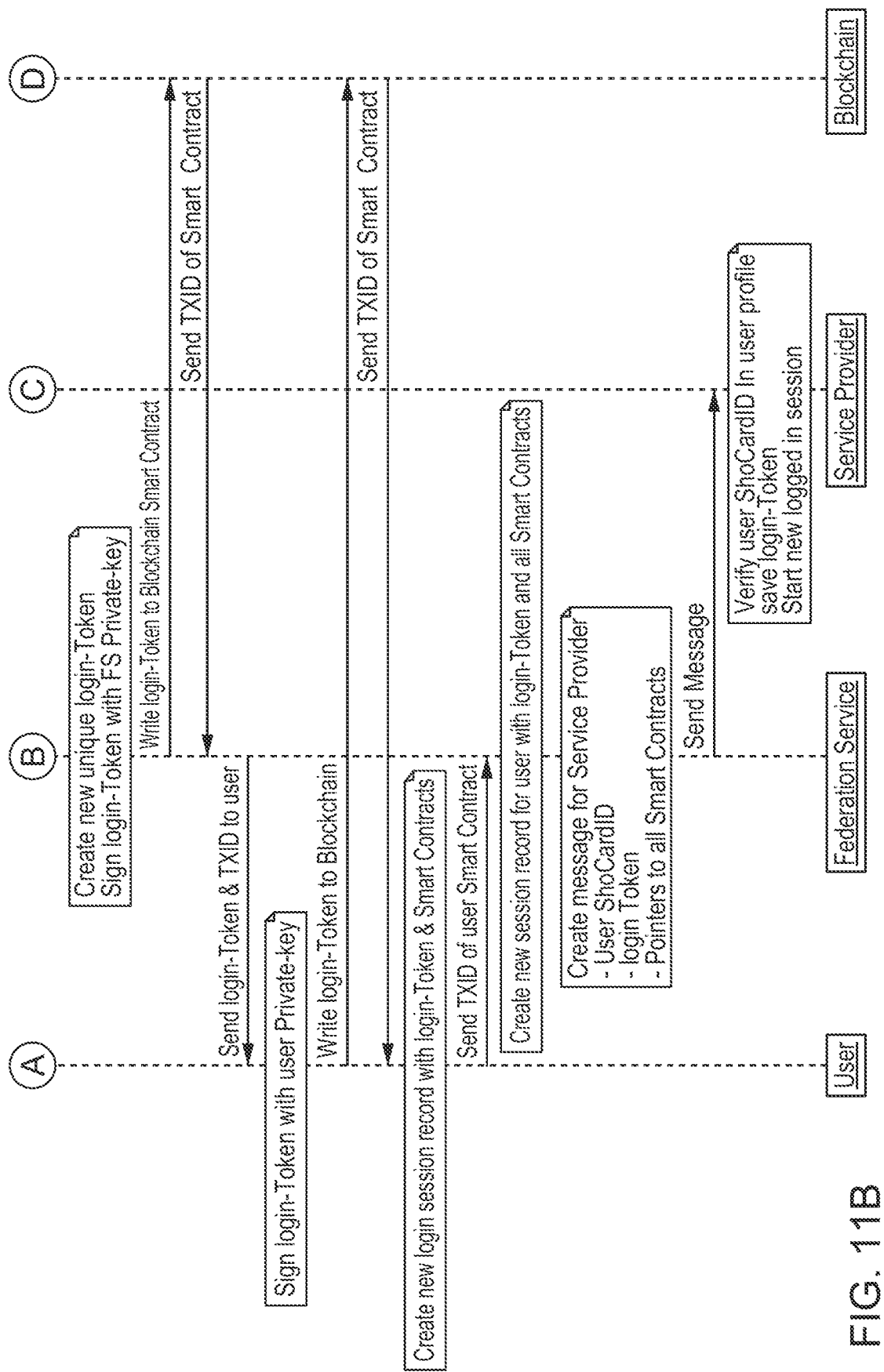

FIGS. 11A-11B is a data flow diagram illustrating BCID Connect implementing login to a service provider, in accordance with one embodiment of the present disclosure.

3A. Creating the Session.

In this scenario, the Secure Envelope specified above is encrypted with the public key of the Federation Service. The Federation Service decrypts the Secure Envelope, ensures that it is properly signed and validates the user's identity by checking the blockchain certifications. The Federation Service also checks to ensure the user has signed the session Token. It then replies back to the Service Provider with this information so the Service Provider is able to start a logged in session for the user. If the session is a web-page (versus an App), the Federation Service redirects the user to the Service Provider's landing page or session.

The information passed to the Service Provider includes:
A. The SessionID initially created and placed in the QR Code;
B. The session Token created by the Federation Service and the signed certifications and blockchain pointers to their smart contracts; and
C. ShoCardID of the user.

As long as the blockchain session Token has not been cancelled, the session can remain active unless the Service Provider logs the user out under its discretion. This can be either through an automatic timeout (e.g., inactive session) or the user uses the Service Provider's page or App to explicitly log out.

3B. Maintaining the Logged in Session.

The Service Provider has used the certified token to start a new session for the user in. It can also check the status of that token to ensure the user's token is still active. It can do so by checking the status of the blockchain smart contract that holds the signed tokens. If either the Federation Service or the User cancels their smart contract for the token, the Service Provider knows that the session has expired.

The Service Provider can check the status of the token on different intervals:
time-based; page-refresh; secure changes (e.g., changing profile information).

Blockchain records can be checked directly by the SP or using the IdP service via Restful API.

4. Viewing and Managing Registered Service Providers and Sessions.

The user's App is cognizant of two actions. It knows which sites it has registered with and it knows which sites and potentially which devices it is currently logged into.

The App can present two views—one for registered sites and the second for the current active sessions. The details of each view are dependent on the set of data that is exchanged and maintained by the App. This however, can give the user knowledge and control over third party registered sites and sessions.

Service Providers that follow the additional requirements can allow the user to remotely and securely manage their sessions or even allow them to manage their registration.

5. Log Out from One or More Service Providers.

The user's active logged in session can be managed by three parties: The user from the App or the Service Providers site, the Federation Service and finally, the Service Provider. For example, the user can go to the Service Providers site and use the controls on the page to log out. It can also log out using her Identity App—this will be explained further in this section. The Federation Service can also decide that the user's session will expire and be logged out. For example, if the Federation Service detects a security breach it may opt to log out the user to protect her. Additionally, the Service Provider can log the user out. For example, if the logged in session is inactive for a certain period of time, the service provider may log the user out for security reasons.

5A. Logging Out Using the App by the User.

Figure 8:
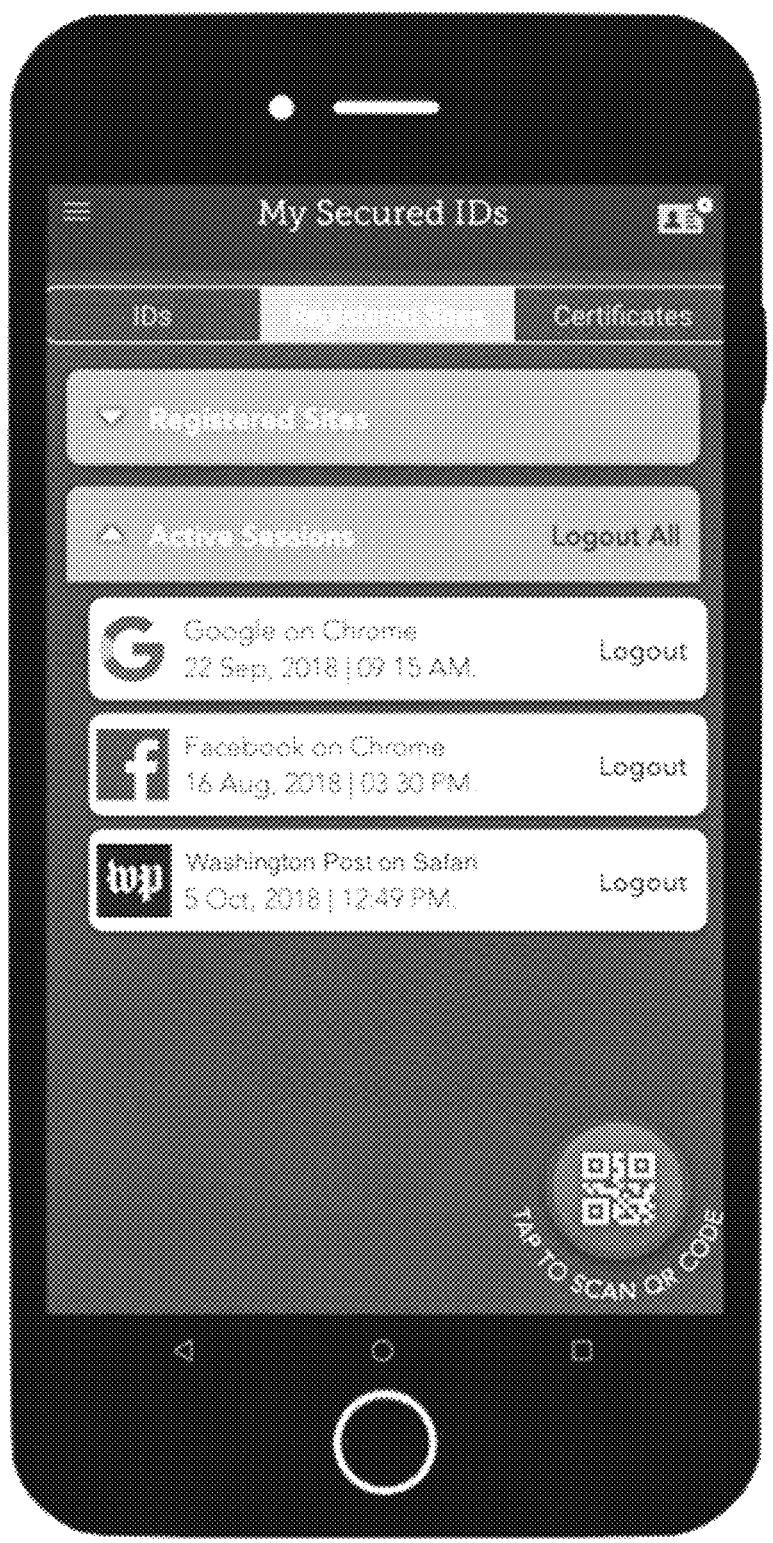
FIG. 8 is a screen shot showing all the active sessions that a user is currently logged into, in accordance with one embodiment of the present disclosure.

As previously described, the user can maintain a view of all active sessions that she is currently logged into, as is shown in FIG. 8. This view is ultimately a list with rows of active sessions along with a button that allows the user to remotely log out of that session. The user can also select all sessions and log out of everything with a single click.

Taking this action causes the App to cancel the certification of the session Token the user had signed in the smart contract that's on the blockchain. The smart contract can be updated by the entity having the private-key used to create it, in one embodiment. In this case, the user is the one with that access to the user-certificate of the Token.

In this scenario, the user can also send a token-cancellation notification to the Federation Service. The Federation Service can check the status of the user's Token to verify that it has been cancelled and the user intends to log out (or use the message it received from the user in a Secure Envelope as a request to logout). Once confirmed, it cancels the session Token that it had signed as well. It then sends a notification message to the Service Provider with the session Token and the certifications plus blockchain pointers. The Service Provider can check the status of the token upon receiving this notification and determine that it's been cancelled and log the user out immediately without having to wait for any other event or action by the user.

Figure 12:
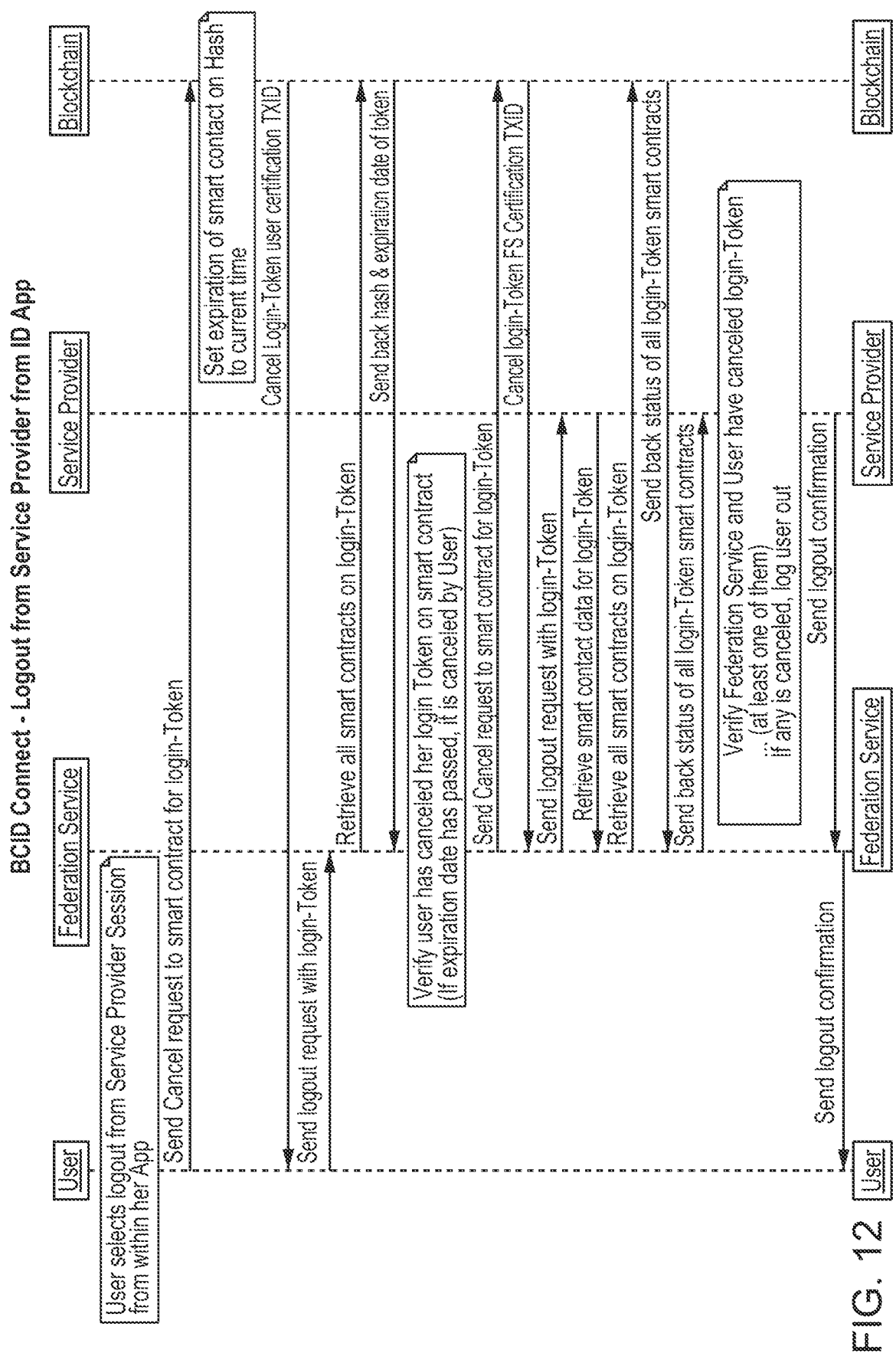
FIG. 12 is a data flow diagram illustrating BCID Connect implementing logout from a service provider from ID App, in accordance with one embodiment of the present disclosure.

FIG. 12 is a data flow diagram illustrating BCID Connect implementing logout from a service provider from ID App, in accordance with one embodiment of the present disclosure.

5B. Log Out Enforced by Federation Service.

Similar to the user, the Federation Service can also cancel a session Token by cancelling the Smart Contract that it has signed on that token even if the user has not cancelled its token. In this event, the Federation Service will also notify the Service Provider so that it can check the status of the smart contract and log the user out. The Federation Service also sends a notification to the user that it has logged the user out. The user can verify the status of the Token signed by the Federation Service and if cancelled, determine that it has been logged out and remove the logged-in session from its list.

5C. Logging Out Via the Service Provider.

A Service Provider usually provides one or more means for a user session to end. The simplest is a link or a button that allows the user to intentionally log out. Additionally, the Service Provider may have rules that allows active sessions to remain logged in and if a user is inactive, it logs them out. There may be other reasons why a Service Provider will end a session for a user.

When this occurs, the Service Provider sends a request to the Federation Service to notify it that the session has been terminated along with the token used for the session. The Federation Service will cancel its token in the smart-contract and then notifies the user with the process described above under "Log out enforced by Federation Service."

6. Alternatives to QR Code Scanning.

Although the examples in this document relied on QR Codes, other alternatives to QR Codes can be used to exchange requests between a Service Provider and a user's App. In particular, if the user is trying to login on a browser or App that is on the same mobile device as the user's identity App, there is no way to scan a QR Code. In these cases, the Federation Service provides a link that will perform an App switch with the necessary codes. The link also maintains the name of the App so after authenticating, the user can switch to the source Service Provider App.

7. Alternatives to Using a Blockchain.

The blockchain provides a number of advantages over a trusted central database and a central server. However, it is possible to utilize the above procedures using a central database. In such a case, the central database can run a local blockchain under its entire control, or skip the blockchain all together and store the data that would otherwise be stored in the blockchain in a database. It is then up to the server that manages that database to ensure the integrity of the records in the database. When other systems want to check the status of those records, instead of going to the blockchain to retrieve the records, they can ask the central server to retrieve the records for them from the central database.

In such a scheme, the tokens are ultimately stored as fields in database records and any number of database scheme can be utilized to manage them.

Identity Management Service Using a Block Chain

Figure 13:
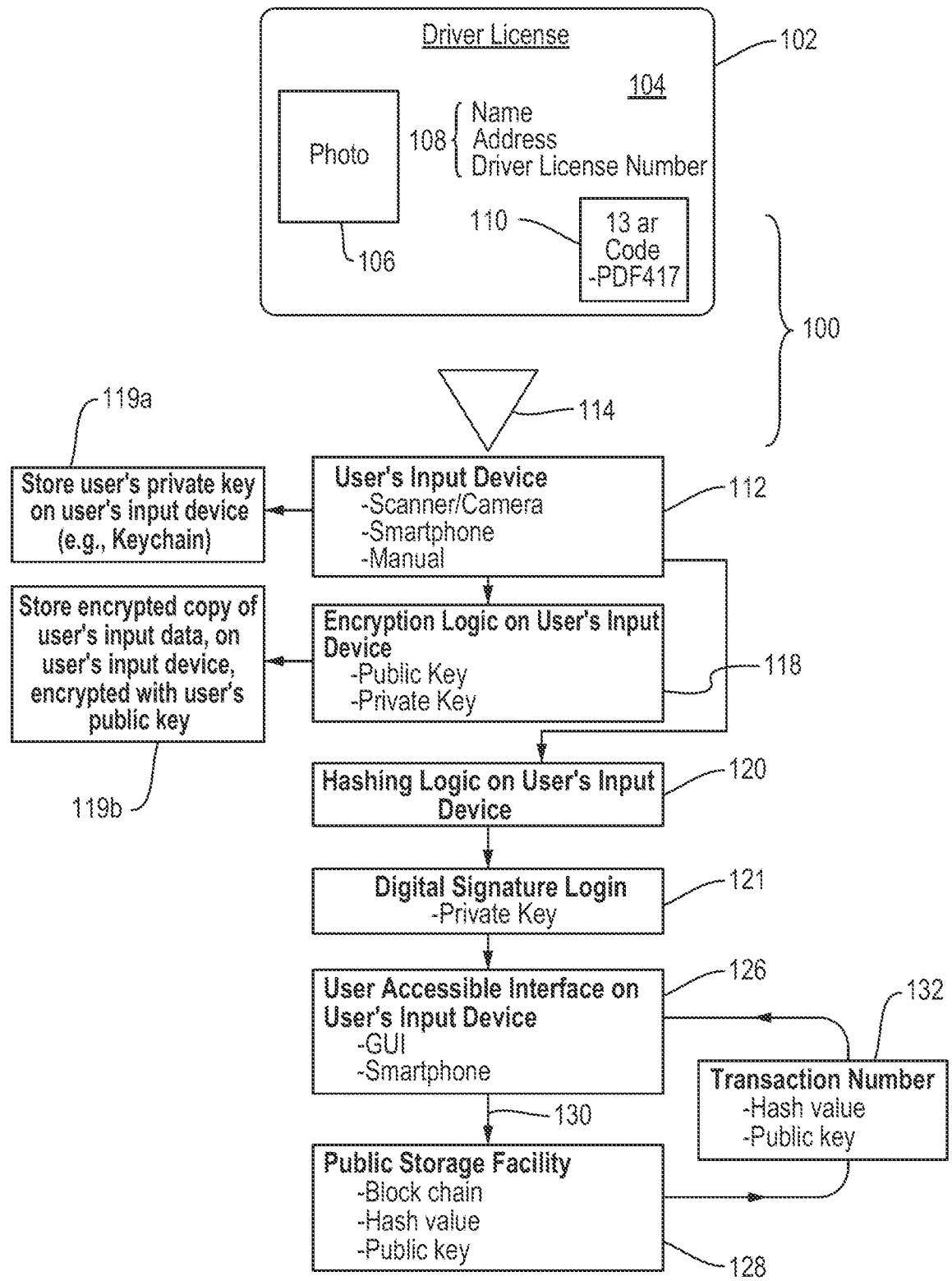
FIG. 13 shows a simplified block diagram of a system and method for sealing an identity of a person in a public storage facility, in accordance with one embodiment of the present disclosure.

FIG. 13 shows a simplified block diagram of a system and method for sealing an identity of a person in a public storage facility, in accordance with one embodiment of the present disclosure. FIG. 13 shows a simplified block diagram for a system 100 and method for managing the identity of a user by way of making verifiable transactions with a public storage facility 128. By way of example, an identification card 102 may be used. In other embodiments, other forms of identification, which may be digital or non-digital may be used. In the example of the identification card 102, personal data 104 is contained thereon, which identifies the user. The personal data can include a photo 106 of the user; the user's name, address and driver license number 108, and/or a bar code 110 or similar computer code for storing, scanning and/or retrieving additional data. Such coding can include PDF417 codes, QR codes, and other such codes. However, it is not necessary to have such code and the identification card may have human-readable text strings. As noted above, the identification card 102 may also take a physical or a digital form and the information can be retrieved either through scanning a code as described, performing Optical Character Recognition (OCR) on text strings, digitally transferring a digital identification card from one system to another, manually inputting the information using a keyboard, manually inputting the information using voice recognition, etc., in example embodiments.

The identification card 102 can be a government issued form of identification such as a driver license, passport, employee badge, military identification, political documentation, or the like. The identification card 102 can also be a privately issued form of identification such as a student ID, library card, social club card, or any other form of identification issued by a third party In one embodiment, as indicated by triangle 114, an input device 112 may be used to input such personal data from the identification card 102 to provide input data. Input device 112 can take many forms. For example, input device 112 can be a digital scanner, digital camera, or smartphone (e.g., with the camera commonly found in smartphones) for reading data from the identification card 102, including any codes appearing on the card 102. The input device 112 can also be a device for manually inputting personal data such as a keyboard, touchscreen, voice recognition device, handwriting recognition device, or other manual input device.

As shown in FIG. 13, the input data can be optionally encrypted by encryption logic 118 and securely stored in operation 119b. In one implementation, the input data is transferred directly to hashing logic 120, without passing through encryption logic 118. For ease of understanding, the operations of the optional encryption logic 118 will be discussed first, and then the operations processed by the hashing logic 120. As such, the process may proceed directly from receiving the user information via 112 to the hashing logic 120.

The input data collected from the input device 112 (e.g., a user's smartphone) is passed to encryption logic 118 on input device 112. In an example embodiment, encryption logic 118 might include software, firmware, hardware, or any combination thereof, and consist of one or more encryption algorithms, e.g., an RSA encryption algorithm. Encryption logic 118 encrypts the input data with a public key to provide encrypted data. The public key is paired with an associated private key as is conventional when generating such keys using an RSA encryption algorithm, an Elliptic Curve Digital Signature Algorithm (ECDSA), or other encryption algorithm known to those skilled in the art. As shown in operation 119b, this encrypted data can then be stored locally on the input device 112 for added security. It can then be accessed with the private key of the user on the input device 112, which might be stored in a more secure part of input device 112, e.g., "the Keychain", in operation 119a, if input device 112 is an iOS (e.g., operating system used by devices made by Apple, Inc.) smartphone. If the device is of a different type, e.g., one using an Android OS (e.g., operating system by Google, Inc.), similar secure device storage methods may be used. In this manner, for added security, the private key is not compromised and is kept safely on the input device 112. It should be understood that the private key may be stored on another device, but similar or additional security should be processed to ensure that the private key is not compromised.

As noted above, the operations to be performed by the hashing logic 120 can proceed directly after receiving the input data from the input device 112. In this embodiment, the hashing logic 120 is used for hashing the input data (e.g., personal information collected) to provide or generate a hash value. The hash value is sometimes referred to as "hash data," that is generated by an algorithm. In an example embodiment, hashing logic 120 might be software, firmware, hardware, or any combination thereof, and consist of one or more hashing algorithms, e.g., a Secure Hash Algorithm (SHA) algorithm. Hashing logic 120 passes the hash value to digital-signature logic 121, which performs a digital signature on the hash value, using the private key on the input device 112. In an example embodiment, digital-signature logic 121 might be a component (or module) of encryption logic 118. In other embodiments, the digital-signature logic 121 may be defined by separate code, firmware, and/or hardware.

In one embodiment, the digital-signature logic 121 then passes the signed hash value and the public key to a user accessible interface 126 (e.g., a graphical user interface or GUI), which might be other software running on the input device 112. In an example embodiment, the user accessible interface 126 might be part of an application or app that includes encryption logic 118, hashing logic 120, and digital-signature logic 121, and/or other modules or code. The user accessible interface 126 might be used by the user to transmit the digitally signed hash value and the public key to a public storage facility 128 via a line 130, and receive back from the public storage facility 128 a transaction number 132 corresponding to the transmitted hash value and public key. As used in this disclosure, a "line" might be part of a wired and/or wireless connection or network, including a bus, an intranet, an internet, an extranet, a public computer network, a private computer network, etc., in an example embodiment. In an alternative example embodiment, the signed hash value might be transmitted to public storage facility 128 by the user and persons retrieving the signed hash value might obtain the public key from elsewhere (e.g., the user, a public database, an Internet repository, a web site, etc.). As is well known, there is no need to keep public keys secure, and in fact, the algorithms using public/private key pairs are design to enable full sharing of public keys. The private key, on the other hand, is kept secure, as noted above.

In one embodiment, the public storage facility 128 can take the form of a block chain (e.g., in a bitcoin online payment system) or any other public or private distributed database. The public storage facility 128 is connected to a communication link via a line and can be adapted to communicate over a public computer network, the internet, an intranet, an extranet, or any private communication network. Broadly speaking, the public storage facility 128 is accessible by any device that has an Internet connection over a network. A block chain, as is known in the art, is a system that enables users' access to securely store data in a public place. The data is deemed secure, as each time data is written, the written data is dependent on previously written data, which includes performing cryptographic hash operations. A benefit of using a block chain is that once data is written to the block chain and a block chain transaction is created, that transaction remains intact, and can be verified in the future. The reason for this, is that data is continually written to the block chain, e.g., after a particular transaction is made, and that later data is dependent on an earlier particular transaction. Consequently, by writing data to a public storage facility that implements a public block chain, later verification of that data is practically ensured to be correct.

As indicated above, in an example embodiment, the input data might be hashed and the resulting hash value might be signed with a digital signature, created using a private key paired with a public key, before transmission, optionally along with the public key, from the input device (e.g., a user's smartphone) 112 to the public storage facility 128 for storage. The user accessible interface 126 is thus adapted to "seal" the signed hash value and the public key in the public storage facility 128. In one embodiment, once the hash value, and optionally the public key of the user is written to the block chain in a transaction, a later verification may be made if another party is able to hash the same input data.

Figure 14:
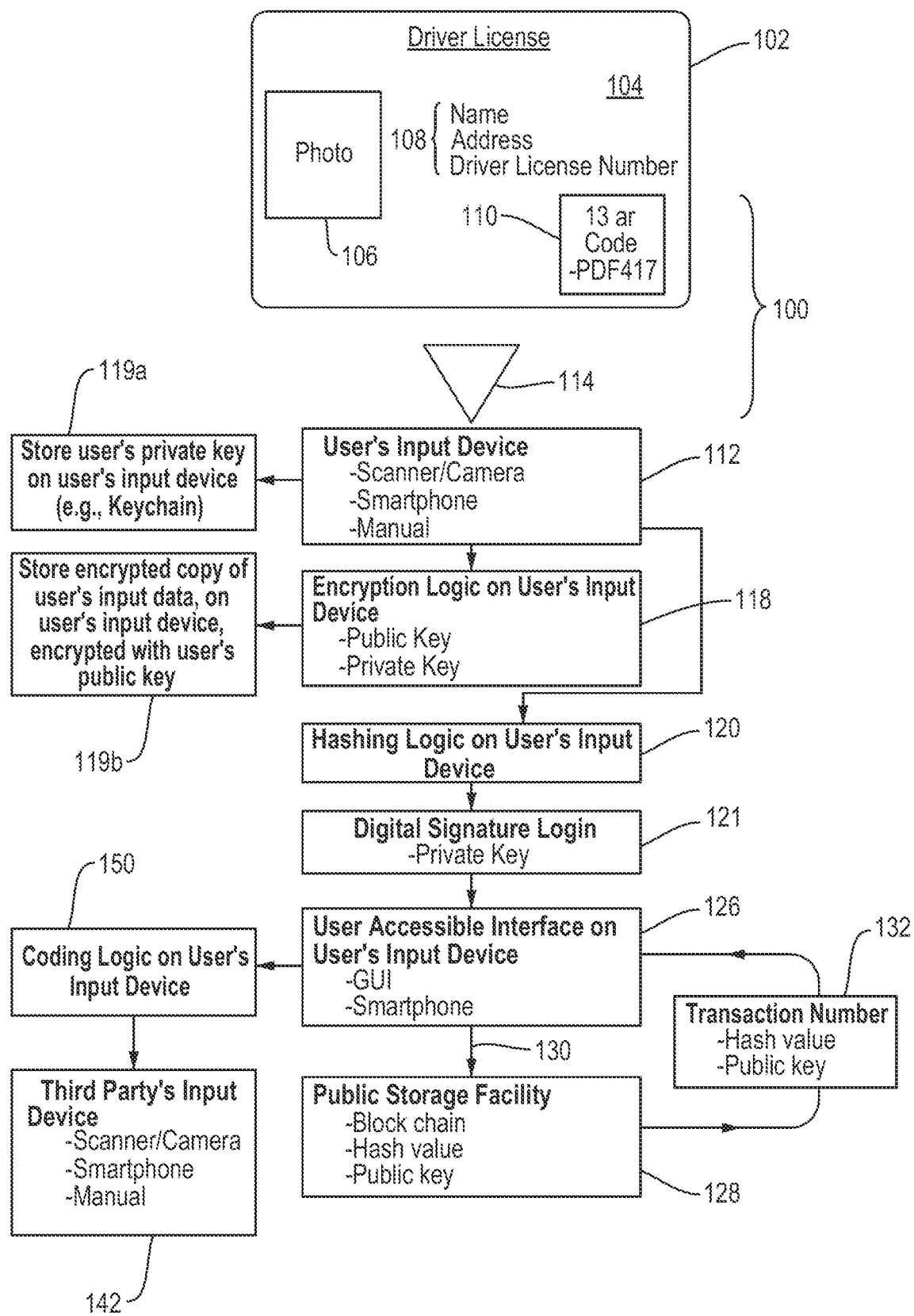
FIG. 14 also shows a simplified block diagram of a system and method for sealing an identity of a person in a public storage facility, in accordance with one embodiment of the present disclosure.

FIG. 14 also shows a simplified block diagram of a system and method for sealing an identity of a person in a public storage facility, in accordance with one embodiment of the present disclosure. As depicted in FIG. 14, user accessible interface 126 (e.g., a GUI) can be controllable by the user of the input device 112 to encrypt and provide the transaction number 132, the input data, and, optionally, the public key of the user, to an input device 142 (e.g., a smartphone) of a third party (e.g., a financial institution or other entity engaging in a commercial, private transaction, or other transaction with the user) to, for example, establish the identity of the user. In one embodiment, the third party will access the block chain using the transaction number 132 to retrieve the digitally signed hash value, and optionally, the public key if the public key has not been previously obtained by the third party from another source/location, and enable comparison with a hash value that is generated by the third party using the input data and the same hashing algorithm. In one embodiment, a distributed public database is a block chain, which receives data for storage from a plurality of entities. The entities need not be related, and the type of data need not be the same. In general, entities storing the block chain are unrelated, and the type of data can vary to almost any type of digital data, e.g., not limited to identity data, commercial data, bitcoin data, etc. Thus, the data received for storage is configured to be processed to generate a transaction record that is dependent on previous data stored to the block chain. The transaction record being dependent on previous data stored to the block chain ensures that data stored to the block chain is not modifiable, as each later data stored to the block chain continues to be dependent on previous data stored to the block chain.

In an example embodiment, the encryption of the transaction number 132, the input data, and, optionally, the public key of the user might be performed by the encryption logic 118 using a public key of a third party paired with a private key of the third party. Then, coding logic 150 on the input device 112 might code the encrypted items into a barcode or QR code and the third party might use input device 142 to scan the barcode or QR code and decode it to gain access to the encrypted items. Thereafter, the third party might decrypt the encrypted items using the private key of the third party to perform a verification operation. In one embodiment, the verification may use an RSA algorithm as explained in further detail below. Other verification algorithms may also be used, depending on the configured implementation.

FIG. 15 (FIGS. 15B-1 and 15B-2) show a process for verifying hashed input data and a digital signature, in accordance with one embodiment of the present disclosure. This verification process is depicted in FIGS. 15B-1 and 15B-2. FIG. 15B-1 shows how a digitally signed hash value is created from input data. The input data (or selected fields of the input data) is hashed into a hash value "ABC" by hashing logic 220 on the user's input device 112, in operation 1. Then the hash value "ABC" is digitally signed with the user's private key using digital-signature logic 121 to create digitally signed hash value "XYZ", in operation 2.

FIG. 15B-2 shows how a digitally signed hash value is verified after being retrieved along with the public key of the user from the public storage facility 228. The input data (or selected fields of the input data) is received from the user's input device 212 at the certifier's input device 242 and is hashed into a generated hash value "ABC" using hashing logic 272, in operation 3. Then the signed hash value "XYZ", the generated hash value "ABC", and the user's public key are input to verification logic 273 in operation 4. The verification logic 273 might include a RSA verification algorithm, in an example embodiment. If the hash value in the digitally signed hash value "XYZ" is the same as the generated hash value "ABC" and the digital signature was signed with a private key that is associated with the user's public key, the verification logic 273 returns a value of "true". Otherwise the verification logic 273 returns a value of "false". It should be understood that the verification logic 273 may be executed on any device (e.g., a user's device, a certifier's device, a verifier's device, a third party's device, a commercial entity's device, a private entity's device, etc.), that needs to perform a verification operation.

Upon receipt of a "true" value from encryption logic 270, the certifier might create a certification record that refers to the verification. In an example embodiment, the certification record might include the transaction number 232, the input data (or selected fields of the input data), received from the user, and, optionally, a timestamp, and the certification record might be hashed and digitally signed by the certifier using a private key of the certifier associated with a public key. Then the certifier might use user accessible interface 280 (e.g., a GUI) to transmit the signed certification record to the public storage facility 228 for storage and receive in return transaction number 282 from the public storage facility 228. In an example embodiment, the certifier might encrypt the certification record with the certifier's public key before transmission to the public storage facility 228, in order to keep the certification record private.

It will be appreciated that the verification process shown in FIGS. 15B-1 and 15B-2 might be used to verify the digital signature on items of data other than the input data (or selected fields of the input data) received by input device 212. In an example embodiment, the item of data that is digitally signed might not be hashed before being digitally signed. In an example embodiment, the verification process shown in FIGS. 15B-1 and 15B-2 might be used to verify a digitally-signed hash of a document other than an identification card, e.g., a digitally-signed certification as described above or a digitally-signed acknowledgement as described below. Or, the same verification process might be used to verify a digitally-signed token (e.g., random number) that is sent by a sender using a secure-envelope process. A secure-envelope process, as described below, might be used instead of, or in addition to, public-key encryption when transmitting data from a user to a certifier, verifier, third party, etc., and vice versa.

In an example embodiment, when using a secure envelope process, a sender might hash a real-time token (e.g., a random number generated by the user's remote device) and digitally sign the hashed token using the sender's private key. In an example embodiment, a timestamp might be optionally included with the token. Then the sender might transmit the signed hashed token and, optionally, the public key associated with the sender's private key to a distributed public database for storage, receiving a transaction number in return from the distributed public database. Thereafter, the sender might transmit the transaction number and the token to a receiver, e.g., a certifier, a verifier, a third party, etc., optionally, after encrypting the transaction number and the token with the receiver's public key. In an example embodiment, the receiver might receive the transaction number and token (optionally including the timestamp), decrypt them using the receiver's private key, if necessary, and then use the transaction number to retrieve the digitally signed hashed and, optionally, the sender's public key from the distributed public database. The receiver might generate a hash of the token using the same hashing algorithm the sender used. Then the receiver might verify, e.g., using an RSA verify call as described above, that the token in the generated hash is the same as the token in the digitally signed hash token and verify that the digital signature was created with the sender's private key. An RSA verify call may be, for example, processed by verifying logic 273, e.g., to execute a verify operation. In an example embodiment, the token (optionally including the timestamp) might not be hashed before being signed.

Figure 16:
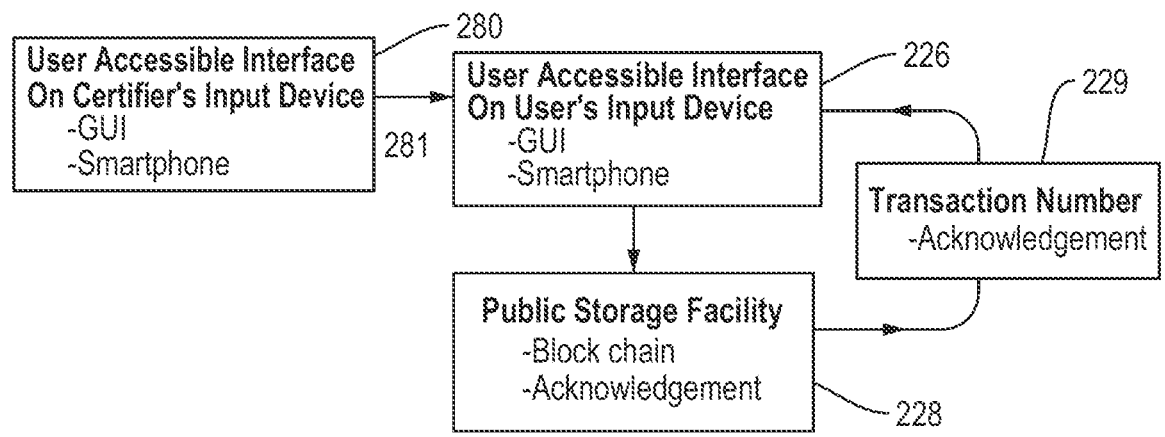
FIG. 16 shows a simplified block diagram for recording an acknowledgement, in accordance with one embodiment of the present disclosure.

FIG. 16 shows a simplified block diagram for recording an acknowledgement, in accordance with one embodiment of the present disclosure. In one configuration, as depicted in FIG. 16, the certifier might encrypt the certification record and transaction number 282 (e.g., the transaction number the certifier received from the public storage facility 228) with the user's public key and transmit in 281 the encrypted certification record to the user, using user accessible interface 280 (e.g., a GUI). Upon receiving the encrypted certification record, the user might decrypt it using the user's private key and then create an acknowledgement record that refers to or includes the certification record, and optionally includes a timestamp, in order to link the two records in the public storage facility 228 to facilitate convenient lookup by a third party, if the certification record is verified. Here again, to verify the certification record, the user might hash the certification record using the same hashing algorithm that the certifier used prior to digital signature by the certifier. The user might use transaction number 282 to retrieve the signed certification record and the certifier's public key from the public storage facility 228. Then the user might verify that the certification record in the generated hash is the same as the certification record in the digitally signed certification record and verify that the digital signature was created with the certifier's private key, e.g., using an RSA verify call as described above.

In an example embodiment, the acknowledgement record might include the certification record, the transaction number 282, and optionally, a timestamp, and the user might digitally sign the acknowledgement record with the user's private key. Then the user might use user accessible interface 228 (e.g., a GUI) to transmit the signed acknowledgement record and the user's public key to the public storage facility 228 for storage and receive a transaction number 229 in response from the public storage facility 228. In an example embodiment, the user might encrypt the signed acknowledgement record with the user's public key before transmission to the public storage facility 228 in order to keep the acknowledgement record private.

Figure 17:
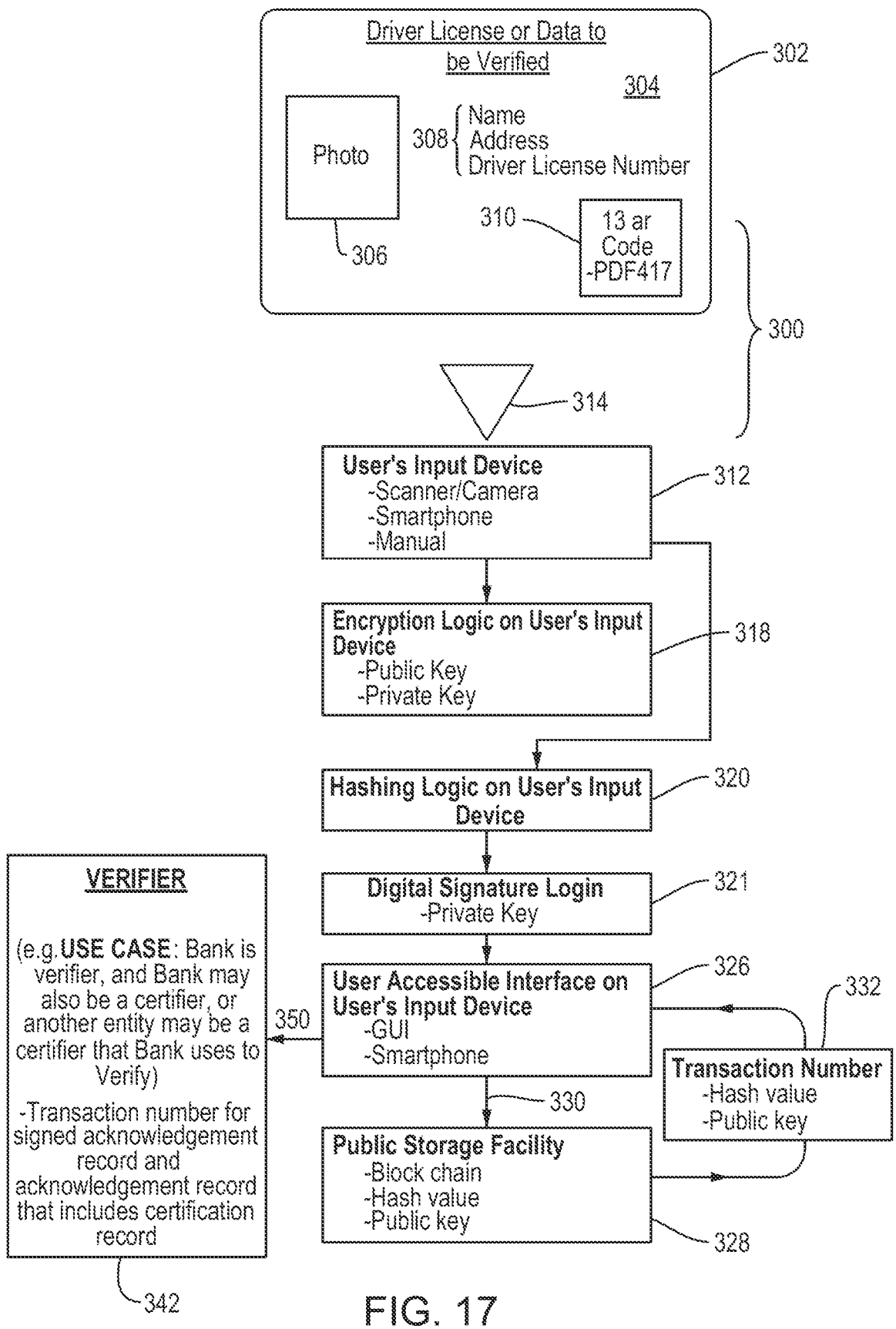
FIG. 17 shows a simplified block diagram of a system and method for verifying an acknowledgement record, in accordance with one embodiment of the present disclosure.

FIG. 17 shows a simplified block diagram of a system and method for verifying an acknowledgement record, in accordance with one embodiment of the present disclosure. In particular, FIG. 17 shows a simplified block diagram for a system and method for certifying a pending transaction. By way of example, an identification card 302 may be used. In other embodiments, other forms of identification, which may be digital or non-digital may be used. In the example of the identification card 302, personal data 304 is contained thereon, which identifies the user. The personal data can include a photo 306 of the user; the user's name, address and driver license number 308, and/or a bar code 310 or similar computer code for storing, scanning and/or retrieving additional data. Such coding can include PDF417 codes, QR codes, and other such codes. However, it is not necessary to have such code and the identification card may have human-readable text strings. As noted above, the identification card 302 may also take a physical or a digital form and the information can be retrieved either through scanning a code as described, performing Optical Character Recognition (OCR) on text strings, digitally transferring a digital identification card from one system to another, manually inputting the information using a keyboard, manually inputting the information using voice recognition, etc., in example embodiments.

The identification card 302 can be a government issued form of identification such as a driver license, passport, employee badge, military identification, political documentation, or the like. The identification card 302 can also be a privately issued form of identification such as a student ID, library card, social club card, or any other form of identification issued by a third party.

In one embodiment, as indicated by triangle 314, an input device 312 may be used to input such personal data from the identification card 302 to provide input data. Input device 312 can take many forms. For example, input device 312 can be a digital scanner, digital camera, or smartphone (e.g., with the camera commonly found in smartphones) for reading data from the identification card 302, including any codes appearing on the card 302. The input device 312 can also be a device for manually inputting personal data such as a keyboard, touchscreen, voice recognition device, handwriting recognition device, or other manual input device.

As shown in FIG. 17, the input data can be optionally encrypted by encryption logic 318 and securely stored. In one implementation, the input data is transferred directly to hashing logic 320, without passing through encryption logic 318. For ease of understanding, the operations of the optional encryption logic 318 will be discussed first, and then the operations processed by the hashing logic 320. As such, the process may proceed directly from receiving the user information via 312 to the hashing logic 320.

The input data collected from the input device 312 (e.g., a user's smartphone) is passed to encryption logic 318 on input device 312. In an example embodiment, encryption logic 318 might include software, firmware, hardware, or any combination thereof, and consist of one or more encryption algorithms, e.g., an RSA encryption algorithm. Encryption logic 318 encrypts the input data with a public key to provide encrypted data. The public key is paired with an associated private key as is conventional when generating such keys using an RSA encryption algorithm, an Elliptic Curve Digital Signature Algorithm (ECDSA), or other encryption algorithm known to those skilled in the art. This encrypted data can then be stored locally on the input device 312 for added security. It can then be accessed with the private key of the user on the input device 312, which might be stored in a more secure part of input device 312, e.g., "the Keychain", if input device 312 is an iOS (e.g., operating system used by devices made by Apple, Inc.) smartphone. If the device is of a different type, e.g., one using an Android OS (e.g., operating system by Google, Inc.), similar secure device storage methods may be used. In this manner, for added security, the private key is not compromised and is kept safely on the input device 312. It should be understood that the private key may be stored on another device, but similar or additional security should be processed to ensure that the private key is not compromised.

As noted above, the operations to be performed by the hashing logic 320 can proceed directly after receiving the user information from the input device 312. In this embodiment, the hashing logic 320 is used for hashing the input data (or selected fields of the input data or personal data) to provide or generate a hash value. The hash value is sometimes referred to as "hash data," that is generated by an algorithm. In an example embodiment, hashing logic 320 might be software, firmware, hardware, or any combination thereof, and consist of one or more hashing algorithms, e.g., a Secure Hash Algorithm (SHA) algorithm. Hashing logic 320 passes the hash value to digital-signature logic 321, which performs a digital signature on the hash value, using the private key on the input device 312. In an example embodiment, digital-signature logic 321 might be a component (or module) of encryption logic 318. In other embodiments, the digital-signature logic 321 may be defined by separate code, firmware, and/or hardware.

In one embodiment, the digital-signature logic 321 then passes the signed hash value and, optionally, the public key to a user accessible interface 326 (e.g., a graphical user interface or GUI), which might be other software running on the input device 312. In an example embodiment, the user accessible interface 326 might be part of an application or app that includes encryption logic 318, hashing logic 320, and digital-signature logic 321, and/or other modules or code. The user accessible interface 326 might be used by the user to transmit the digitally signed hash value and, optionally, the public key to a public storage facility 328 via a line 330, and receive back from the public storage facility 328 a transaction number 332 corresponding to the transmitted hash value and public key.

In one embodiment, the public storage facility 328 can take the form of a block chain (e.g., in a bitcoin online payment system) or any other public or private distributed database. The public storage facility 328 is connected to a communication link via a line and can be adapted to communicate over a public computer network, the internet, an intranet, an extranet, or any private communication network. Broadly speaking, the public storage facility 328 is accessible by any device that has an Internet connection over a network.

As indicated above, in an example embodiment, the input data might be hashed and the resulting hash value might be signed with a digital signature, created using a private key paired with a public key, before transmission, optionally along with the public key, from the input device (e.g., a user's smartphone) 312 to the public storage facility 328 for storage. The user accessible interface 326 is thus adapted to "seal" the signed hash value and the public key in the public storage facility 328. In one embodiment, once the hash value, and, optionally, the public key of the user is written to the block chain in a transaction, a later verification may be made if another party is able to hash the same input data.

The user accessible interface 326 (e.g., a GUI) can be controllable by the user of the input device 312 to transmit, in 350, an acknowledgement record, a transaction number for a signed acknowledgement record, and optionally the user's public key to a verifier 342. In an example embodiment, transaction number 332 for the signed input data and the input data might also be transmitted to verifier 342, for verification using the verification process used by the certifier, as described above. As used herein, to provide broad understanding of the functions or operation of verifier 342, an example use case of a bank, being the verifier is provided. It should be understood that the verifier can be any entity that needs to verify identity, data, or transaction(s). Additionally, the certifier may be any entity that has certified identity, data, or transaction(s). Thus, in this use case example, the bank is not necessarily the same entity as the certifier, but in other circumstances, the bank may also be the certifier. By way of example, the bank may verify a certification made by another entity, e.g., a credit card company, a car company, a government agency, a private entity, etc. Acknowledgement records and transaction numbers for signed acknowledgement records were discussed in detail above with respect to FIG. 16. As noted indicated above, the user might use encryption with the verifier's public key and/or a secure-envelope process for transmission 350.

Figure 18:
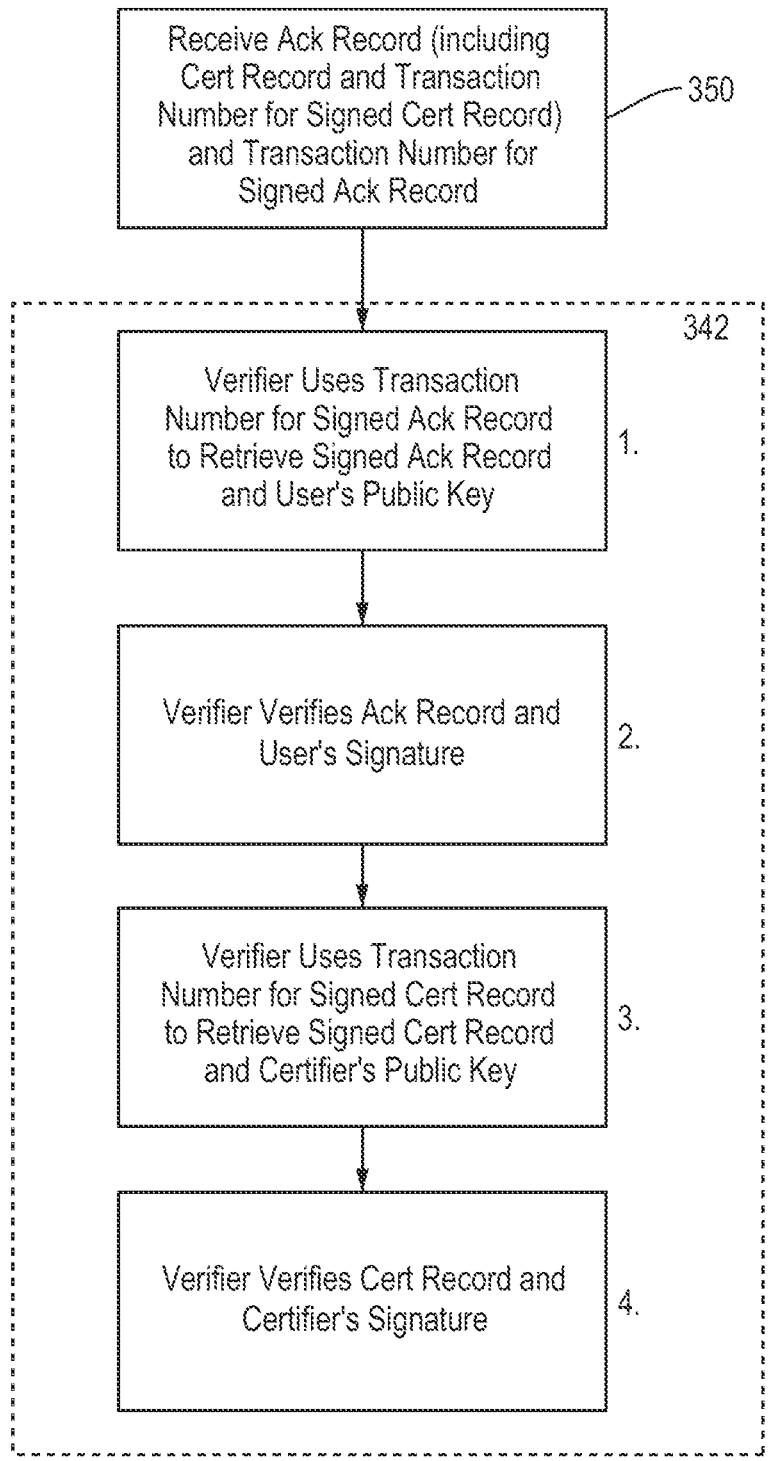
FIG. 18 shows a flowchart diagram for a method for verifying an acknowledgement record and its underlying certification record, in accordance with one embodiment of the present disclosure.

FIG. 18 shows a flowchart diagram for a method for verifying an acknowledgement record and its underlying certification record, in accordance with one embodiment of the present disclosure.

Once the verifier receives the acknowledgement record and the transaction number for the signed acknowledgement record, the verifier might use the process shown in FIG. 18 to verify the acknowledgement record and its underlying certification record. In operation 1, the verifier uses the transaction number to retrieve the signed acknowledgement record and, optionally, the user's public key from public storage facility 328. Then, in operation 2, the verifier hashes the acknowledgement record with the same hashing algorithm that was used by the user and verifies the acknowledgement record and the user's signature, using a verification algorithm as discussed in detail above. If the verification is successful, the verifier uses the transaction number for the signed certification record to retrieve the signed certification record and the certifier's public key from public storage facility 328, in operation 3. Then, in operation 4, the verifier hashes the certification record with the same hashing algorithm that was used by the certifier and verifies the certification record and the certifier's signature, using a verification algorithm as discussed in detail above. If this verification is also successful, the verifier might create another certification record as discussed above and transmit it to public storage facility 328, receiving, in response, another transaction number, which might be transmitted along with the verifier's certification record to the user for another acknowledgement record.

In the event the certification record and/or the acknowledgement record are optionally encrypted before transmission to the block chain, the user transmits an unencrypted acknowledgment record to the verifier and the verifier performs its verifications using the data in the unencrypted acknowledgement record. In an example embodiment, these verifications include checking that an acknowledgment record in fact exists in the block chain with the transaction number for the signed acknowledgement record. Also, in an example embodiment, the unencrypted acknowledgment record includes the transaction number of the signed certification record along with other unencrypted data from the certification record. Using the transaction number for the signed certification and the unencrypted data from the certification record, the verifier can confirm that the certification record in fact exists on the block chain and can process the unencrypted data in the certification record to verify the certifier's signature, even if the certification record was also encrypted before transmission to the block chain.

In both FIGS. 17 and 18, systems and methods for verifying the identity of a user are described, and include the user's input device 312, in accordance with embodiments of the present disclosure. The user's input device 312 is configured for receiving personal data identifying the user from an identification card, for example, that defines input data. The input device may be configured to execute an encrypting machine configured for encrypting the input data using a public key of the user, wherein the public key is paired with a private key of the user. The input device may be configured to execute a hashing machine configured for hashing the encrypted input data to provide a hash value. The input device may be configured for executing a user accessible interface for transmitting the hash value and the public key to a public storage facility (e.g., blockchain) and for receiving back from the public storage facility a transaction number corresponding to the hash value and the public key. The transaction number and the public key may be used for purposes of verifying the identity of the user without decrypting the encrypted input data. In particular, a receiver of the transmitted input data uses the transaction number and the public key of the user to perform an encryption of the input data, and determine whether the identity is verified. That is, the receiver performs the same processes as the user's input device 312 (e.g., encryption, hashing, etc.) to verify that the transmitted input data (as received by the receiver) is the same data used for storing the hash value in the public storage facility corresponding to the same transaction number. Specifically, the process of verifying an identity of a user by signing, using a public key of the user, a hash value of the personal identifying data of the user, and then sending that signed value and the public key to a public storage facility and receiving from the public storage facility a transaction number corresponding to the hash value and the public key, and then having a receiver (e.g., of a verifier) receive the personal identifying data of the user, and the transaction number and the public key of the user, then performing an encryption of the personal identifying data of the user, and determining whether the identity is verified, without decrypting the encrypted data (e.g., stored to the blockchain) (because the newly encrypted data should match that stored to the blockchain, or be verifiable to match that stored to the blockchain).

Figure 19:
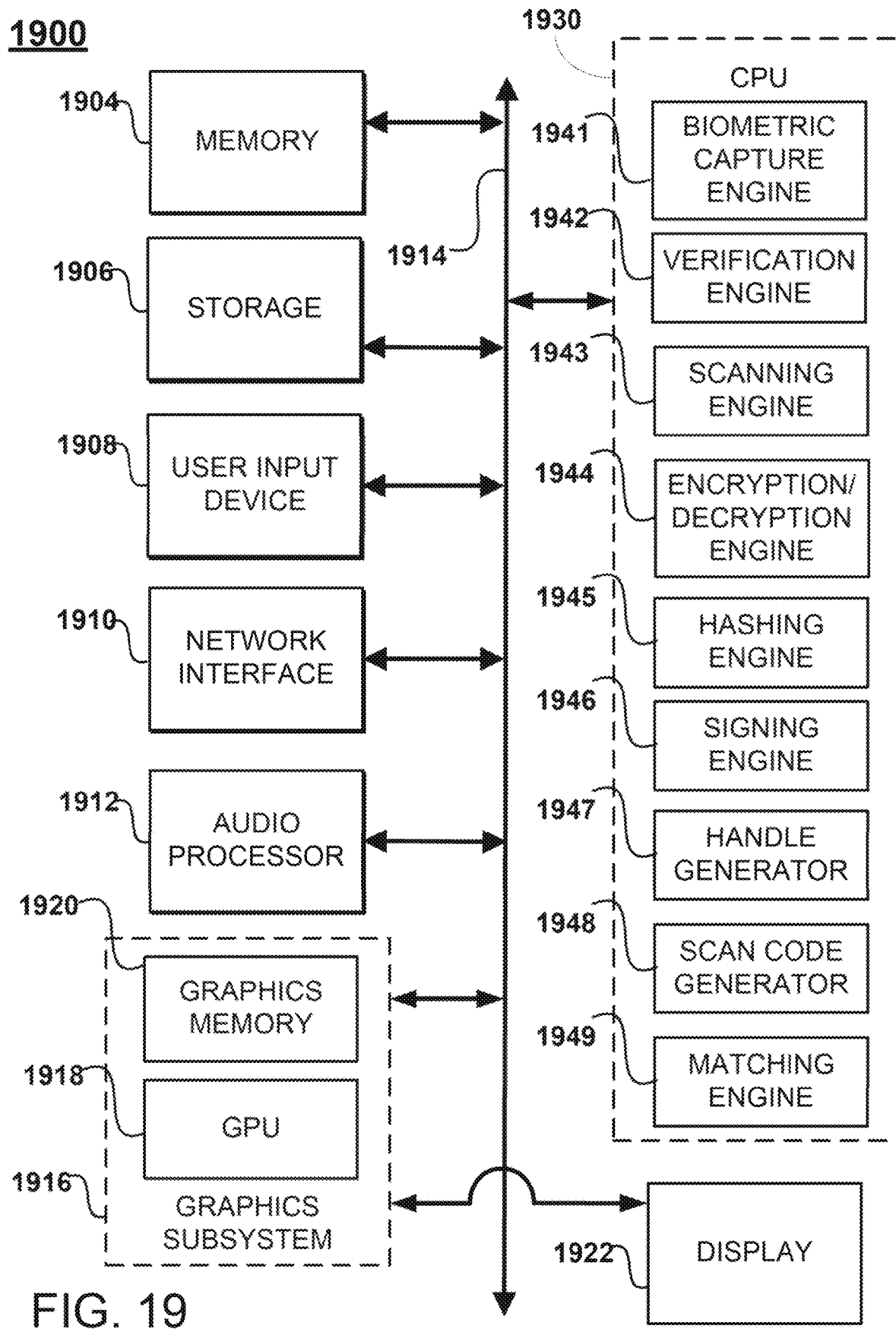
FIG. 19 illustrates components of an example device that can be used to perform aspects of the various embodiments of the present disclosure.

FIG. 19 illustrates components of an example device that can be used to perform aspects of the various embodiments of the present disclosure. For example, FIG. 19 illustrates an exemplary hardware system suitable for implementing a device in accordance with one embodiment. This block diagram illustrates a computer system 1900, such as a personal computer, video game console, personal digital assistant, or other digital device, suitable for practicing an embodiment of the invention. Computer system 1900 includes a central processing unit (CPU) 1902 for running software applications and optionally an operating system. CPU 1902 may be comprised of one or more homogeneous or heterogeneous processing cores.

In accordance with various embodiments, CPU 1902 is one or more general-purpose microprocessors having one or more processing cores. Further embodiments can be implemented using one or more CPUs with microprocessor architectures specifically adapted for highly parallel and computationally intensive applications. For example, CPU 1930 may be configured to include a biometric capture engine 1941 configured for capturing biometric data, a verification engine 1942 for performing verification logic (e.g., verifying data that is signed, registered, and/or certified), a scanning engine 1943 configured for scanning codes (e.g., QR code, scan code, PDF417 code, etc.), an encryption/decryption engine 1944 configured for encrypting and decrypting data using a public/private key pair, a hashing engine 1945 configured for hashing data using any one of a number of well known hashing algorithms, a signing engine 1946 configured for creating a digital signature using a private key, a handle generator 1947 configured for generating a session ID or envelope ID, a scan code generator 1948 for generating a scannable code (e.g., QR code, scan code, PDF417 code, etc.), an a comparator or matching engine 1949 configured for comparing newly captured biometric data and original biometric data.

Memory 1904 stores applications and data for use by the CPU 1902. Storage 1906 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1908 communicate user inputs from one or more users to the computer system 1900, examples of which may include keyboards, mice, joysticks, touch pads, touch screens, still or video cameras, and/or microphones. Network interface 1910 allows computer system 1900 to communicate with other computer systems via an electronic communications network, and may include wired or wireless communication over local area networks and wide area networks such as the Internet. An audio processor 1912 is adapted to generate analog or digital audio output from instructions and/or data provided by the CPU 1902, memory 1904, and/or storage 1906. The components of computer system 1900, including CPU 1902, memory 1904, data storage 1906, user input devices 1908, network interface 1910, and audio processor 1912 are connected via one or more data buses 1922

A graphics subsystem 1914 is further connected with data bus 1922 and the components of the computer system 1900. The graphics subsystem 1914 includes a graphics processing unit (GPU) 1916 and graphics memory 1918. Graphics memory 1918 includes a display memory (e.g., a frame buffer) used for storing pixel data for each pixel of an output image. Graphics memory 1918 can be integrated in the same device as GPU 1916, connected as a separate device with GPU 1916, and/or implemented within memory 1904. Pixel data can be provided to graphics memory 1918 directly from the CPU 1902. Alternatively, C P U 1902 provides the GPU 1916 with data and/or instructions defining the desired output images, from which the GPU 1916 generates the pixel data of one or more output images. The data and/or instructions defining the desired output images can be stored in memory 1904 and/or graphics memory 1918. In an embodiment, the GPU 1916 includes 3D rendering capabilities for generating pixel data for output images from instructions and data defining the geometry, lighting, shading, texturing, motion, and/or camera parameters for a scene. The GPU 1916 can further include one or more programmable execution units capable of executing shader programs.

The graphics subsystem 1914 periodically outputs pixel data for an image from graphics memory 1918 to be displayed on display device 1922. Display device 1922 can be any device capable of displaying visual information in response to a signal from the computer system 1900, including CRT, LCD, plasma, and OLED displays. Computer system 1900 can provide the display device 1922 with an analog or digital signal.

Accordingly, embodiments of the present disclosure disclosing authenticated login, registration, call center validation, and biometric authentication of a user have been described. While specific embodiments have been provided to demonstrate the use of registration, validation, and certification of data, these are described by way of example and not by way of limitation. Those skilled in the art having read the present disclosure will realize additional embodiments falling within the spirit and scope of the present disclosure.

The various embodiments defined herein may define individual implementations or can define implementations that rely on combinations of one or more of the defined embodiments. Further, embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein.

The invention claimed is:

1. A method, comprising:
receiving, at a federation service and from a user device associated with a user, a first secure envelope, the first secure envelope encrypted with a public key of the federation service and including (a) a federation service certification, (b) a self-certification, (c) a pointer to a first copy of a federation service hashed federation service certification, the first copy of the federation service hashed federation service certification previously generated by hashing the federation service certification using a first hashing technique and previously stored in a public storage facility by the federation service, and (d) a pointer to a user device hashed self-certification, the user device hashed self-certification previously stored in the public storage facility by the user device and generated by hashing the self-certification using a second hashing technique;
decrypting the first secure envelope using a private key of the federation service;
retrieving the user device hashed self-certification from the public storage facility using the pointer to the user device hashed self-certification;
retrieving the first copy of the federation service hashed federation service certification from the public storage facility using the pointer to the first copy of the federation service hashed federation service certification;
hashing the federation service certification using the first hashing technique to generate a second copy of the federation service hashed federation service certification;
hashing the self-certification using the second hashing technique to generate a federation service hashed self-certification;
in response to verifying that (a) the federation service hashed self-certification matches the user device hashed self-certification, and (b) the first copy of the federation service hashed federation service certification matches the second copy of the federation service hashed federation service certification, sending a message to an entity to cause the entity to register a user profile associated with the user and in a database associated with the entity;
in response to a request to grant the user device access to the user profile, generating a login token;
signing the login token using the private key of the federation service to generate a federation service signed login token;
storing the federation service signed login token in a first smart contract in the public storage facility;
receiving, from the public storage facility, a pointer to the first smart contract;
sending the federation service signed login token and the pointer to the first smart contract to the user device;
receiving, from the user device, a second secure envelope encrypted with the public key of the federation service and including (a) a user device signed login token, the user device signed login token being the federation service signed login token after the user device has digitally signed the federation service signed login token with a private key of the user device, and (b) a pointer to a second smart contract in the public storage facility including the user device signed login token;
decrypting the second secure envelope using the private key of the federation service;
verifying that the user is allowed to access the user profile using the second secure envelope; and
sending the user device signed login token and the pointer to the second smart contract to the entity to cause the entity to grant the user device access to the user profile to start a logged in session with the user profile.

2. The method of claim 1, further comprising:
receiving, at the federation service and from the user device prior to the receiving of the first secure envelope, a third secure envelope encrypted with the public key of the federation service and including (a) the self-certification and (b) the pointer to the user device hashed self-certification previously stored in the public storage facility by the user device;
decrypting the third secure envelope using the private key of the federation service;
retrieving the user device hashed self-certification from the public storage facility using the pointer to the user device hashed self-certification included in the third secure envelope;
hashing the self-certification using the second hashing technique to generate the federation service hashed self-certification;
in response to verifying that the user device hashed self-certification from the public storage facility matches the federation service hashed self-certification, generating the federation service certification;
hashing the federation service certification using the first hashing technique to generate the first copy of the federation service hashed federation service certification;
storing the first copy of the federation service hashed federation service certification in the public storage facility;
receiving, from the public storage facility, the pointer to the first copy of the federation service hashed federation service certification; and
sending the federation service certification and the pointer to the first copy of the federation service hashed federation service certification to the user device.

3. The method of claim 1, wherein the second secure envelope further includes (a) the federation service certification, (b) the self-certification, (c) the pointer to the first copy of the federation service hashed federation service certification in the public storage facility, and (d) the pointer to the user device hashed self-certification, and the verifying that the user is allowed to access the user profile includes:
retrieving the user device hashed self-certification from the public storage facility using the pointer to the user device hashed self-certification;
retrieving the first copy of the federation service hashed federation service certification from the public storage facility using the pointer to the first copy of the federation service hashed federation service certification;
hashing the self-certification included in the second secure envelope using the first hashing technique to generate the federation service hashed self-certification;
verifying that the federation service hashed self-certification matches the user device hashed self-certification;
hashing the federation service certification included in the second secure envelope using the second hashing technique to generate the second copy of the federation service hashed federation certification; and
verifying that the first copy of the federation service hashed federation certification matches the second copy of the federation service hashed federation service certification.

4. The method of claim 1, further comprising:
in response to receiving, from the user device, an indication to end the logged in session for the user profile, verifying that the user device signed login token is cancelled;
cancelling the federation service signed login token; and
sending a message to the entity to cause the entity to end the logged in session for the user profile.

5. The method of claim 1, further comprising:
in response to receiving an indication to end the logged in session for the user profile, cancelling the first smart contract and the second smart contract; and
sending a notification to the entity to check a status of the first smart contract and the second contract to cause the entity to end the logged in session for the user profile.

6. The method of claim 1, wherein the first smart contract and the second smart contract are one smart contract.

7. The method of claim 1, further comprising:
in response to receiving, from the entity, a confirmation indicating the user profile has been generated, sending a representation of the confirmation to the user device.

8. The method of claim 1, wherein the first hashing technique is the same as the second hashing technique.

9. The method of claim 1, wherein the public storage facility is a blockchain.

10. A method, comprising:
hashing, at a user device associated with a user, a self-certification associated with the user using a first hashing technique to generate a self-certification hash;
sending, to a public storage facility, the self-certification hash to cause the public storage facility to store the self-certification hash;
receiving, from the public storage facility, a pointer to the self-certification hash;
sending, to a federation service, a first secure envelope encrypted with a public key of the federation service, the first secure envelope including (a) the self-certification, and (b) the pointer to the self-certification hash;
receiving, from the federation service, a federation service certification and a pointer to a federation service certification hash stored in the public storage facility by the federation service;
sending a second secure envelope, encrypted with at least one of the public key of the federation service or a public key of an entity, to at least one of the federation service or the entity, the second secure envelope including the federation service certification, the self-certification, the pointer to the self-certification hash, and the pointer to the federation service certification hash;
receiving a confirmation indicating that a profile associated with the user has been registered in a database associated with the entity;
receiving, from the federation service, a signed login token and a pointer to a first smart contract stored in the public storage facility and including the signed login token;
signing the signed login token using a private key of the user device to generate a user device signed login token;
sending the user device signed login token to the public storage facility;
receiving a pointer to a second smart contract stored in the public storage facility and including the user device signed login token;
sending a third secure envelope, encrypted with the public key of the federation service and including (a) the user device signed login token, and (b) the pointer to the second smart contract, to the federation service; and
initiating a logged in session with the profile at the entity.

11. The method of claim 10, further comprising:
in response receiving an indication from the user to end the logged in session, sending a cancel request to the public storage facility to cause the logged in session to end.

12. The method of claim 10, wherein the user device is a mobile device and the public storage facility is a blockchain.

13. A non-transitory processor-readable medium storing code representing instructions to be executed by a processor, the instructions comprising code to cause the processor to:
receive, at a federation service and from a user device associated with a user, a first secure envelope, the first secure envelope encrypted with a public key of the federation service and including (a) a self-certification, (b) a federation service certification, (c) a pointer to a first data item associated with the self-certification, and (d) a pointer to a second data item associated with the federation service certification;
decrypt the first secure envelope using a private key of the federation service;
retrieve, from a public storage facility, the first data item and the second data item using the pointer to the first data item and the pointer to the second data item, respectively;
verify that the first data item corresponds to the self-certification and that the second data item corresponds to the federation service certification;
in response to verifying that the first data item corresponds to the self-certification and the second data item corresponds to the federation service certification, send a message to an entity to cause the entity to generate a profile associated with the user and in a database associated with the entity;
generate a login token;
sign the login token using the private key of the federation service to generate a federation service signed login token;
store the federation service signed login token in a first smart contract stored in the public storage facility;
receive, from the public storage facility, a pointer to the first smart contract;
send the federation service signed login token and the pointer to the first smart contract to the user device;
receive, from the user device, a second secure envelope encrypted with the public key of the federation service and including (a) a user device signed login token, the user device signed login token being the federation service signed login token after the user device has digitally signed the federation service signed login token with a private key of the user device, (b) a pointer to a second smart contract stored in the public storage facility, by the user device, and including the user device signed login token, (c) the self-certification, (d) the federation service certification, (e) the pointer to the first data item associated with the self-certification, and (f) the pointer to the second data item associated with the federation service certification;
decrypt the second secure envelope using the private key of the federation service;
retrieve, from the public storage facility, the first data item and the second data item using the pointer to the first data item included in the second secure envelope and the pointer to the second data item included in the second secure envelope, respectively; and
in response to verifying that the first data item corresponds to the self-certification included in the second secure envelope and the second data item corresponds to the federation service certification included in the second secure envelope, cause the entity to start a logged in session at the entity with the profile.

14. The non-transitory processor-readable medium of claim 13, the code further comprising code to cause the processor to:
receive, at the federation service and from the user device, a third secure envelope encrypted with the public key of the federation service and including the self-certification and the pointer to the first data item associated with the self-certification;
decrypt the third secure envelope using the private key of the federation service;
retrieve the first data item from the public storage facility using the pointer to the first data item;
in response to verifying that the first data item corresponds to the self-certification included in the second secure envelope, generating the federation service certification;
store the second data item associated with the federation service certification in the public storage facility;
receive, from the public storage facility, the pointer to the second data item after storing the second data item in the public storage facility; and
send, to the user device, the pointer to the second data item and the federation service certification.

15. The non-transitory processor-readable medium of claim 13, wherein the first data item is a first hash value hashed using a first hashing technique, and the second data item is a second hash value hashed using a second hashing technique different from the first hashing technique.

16. The non-transitory processor-readable medium of claim 13, further comprising code to cause the processor to:
in response to an indication to end the logged in session with the profile at the entity, send a request to cancel the first smart contract and the second smart contract; and
send an indication to the entity to check a status of the first smart contract and the second smart contract to cause the entity to end the logged in session with the profile.

17. The non-transitory processor-readable medium of claim 13, wherein the public storage facility is a blockchain.

* * * * *